United States Patent
Patil et al.

(10) Patent No.: US 10,230,639 B1
(45) Date of Patent: Mar. 12, 2019

(54) ENHANCED PREFIX MATCHING

(71) Applicant: Innovium, Inc., San Jose, CA (US)

(72) Inventors: Vasant Shankargouda Patil, San Jose, CA (US); Puneet Agarwal, Cupertino, CA (US); Gururaj Ananthateerta, Santa Clara, CA (US); Rupa Budhia, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 15/671,151

(22) Filed: Aug. 8, 2017

(51) Int. Cl.
| | |
|---|---|
| *H04L 12/745* | (2013.01) |
| *H04L 12/753* | (2013.01) |
| *H04L 12/743* | (2013.01) |
| *G06F 16/22* | (2019.01) |
| *G06F 16/2453* | (2019.01) |

(52) U.S. Cl.
CPC ........... *H04L 45/748* (2013.01); *H04L 45/48* (2013.01); *H04L 45/7453* (2013.01); *H04L 45/7457* (2013.01); *G06F 16/2246* (2019.01); *G06F 16/24535* (2019.01)

(58) Field of Classification Search
CPC ... H04L 45/748; H04L 45/7457; H04L 45/48; H04L 45/7453; G06F 17/30327; G06F 17/30451
See application file for complete search history.

(56) References Cited

U.S. PATENT DOCUMENTS

| | | |
|---|---|---|
| 7,313,666 B1 | 12/2007 | Silva et al. |
| 7,936,764 B1 | 5/2011 | Krishnan |
| 7,986,696 B1 | 7/2011 | Miliavisky et al. |
| 2002/0131432 A1 | 9/2002 | Bachmutsky et al. |
| 2013/0031077 A1 | 1/2013 | Liu et al. |

(Continued)

FOREIGN PATENT DOCUMENTS

WO  2011078812 A1  6/2011

OTHER PUBLICATIONS

Kostas Pagiamtzis et al., Titled "Content-Addressable Memory (CAM) Circuits and Architectures: A Tutorial and Survey", (Pagiamtzis hereinafter) was published in IEEE Journal of Solid-State Circuits, vol. 41, No. 3, Mar. 2006.

(Continued)

*Primary Examiner* — Lakeram Jangbahadur
(74) *Attorney, Agent, or Firm* — Wong & Rees LLP; Karl T. Rees

(57) ABSTRACT

Approaches, techniques, and mechanisms are disclosed for maintaining efficient representations of prefix tables for utilization during the operation of a network device. In an embodiment, the performance of a network device is greatly enhanced using a working representation of a prefix table that includes a prefix index and a plurality of associated prefix arrays. In an embodiment, this working representation is bifurcated across a higher-performing memory for the prefix index and a lower-performing memory for the prefix arrays. In an embodiment, management of this working representation is greatly simplified using a sharded prefix tree that is divided into subtrees based on constraints of the memory in which this working representation is stored. In yet another embodiment, a sharded prefix tree may itself be utilized to more efficiently find a longest prefix match for an input key.

20 Claims, 12 Drawing Sheets

(56) References Cited

U.S. PATENT DOCUMENTS

| | | | |
|---|---|---|---|
| 2013/0297641 A1* | 11/2013 | Shinjo | G06F 17/30327 |
| | | | 707/758 |
| 2014/0086249 A1 | 3/2014 | Assarpour | |
| 2015/0098470 A1* | 4/2015 | Sun | H04L 45/748 |
| | | | 370/392 |
| 2017/0142013 A1* | 5/2017 | Zhang | H04L 45/48 |

OTHER PUBLICATIONS

McAuley et al., presented in IEEE INFOCOM '93 The Conference on Computer Communications, Proceedings, Mar. 28-Apr. 1, 1993, Titled Fast Routing Table Lookup Using CAMs, (McAuley hereinafter) was published as DOI: 10.1109/INFCOM.1993.253403.

Satendra Maurya et al., Titled "Low Power Fast and Dense Longest Prefix Match Content Addressable Memory for IP Routers," (Maurya hereinafter) was published Aug. 19-21, 2009.

Somnath Paul et al., Titled "Reconfigurable Computing Using Content Addressable Memory for Improved Performance and Resource Usage", (Paul hereinafter) was published Jun. 8-13, 2008.

United States Patent and Trademark Office, U.S. Appl. No. 15/290,821, Non-Final Office Action dated Sep. 11, 2018.

\* cited by examiner

ENHANCED PREFIX MATCHING

CROSS-REFERENCE TO RELATED APPLICATIONS

This application is related to U.S. patent application Ser. No. 14/883,588, filed Oct. 14, 2015, entitled "Network Device Storage of Incremental Prefix Trees," by Agarwal et al., the entire contents of which are hereby incorporated by reference for all purposes as if fully set forth herein. This application is further related to U.S. patent application Ser. No. 15/290,821, filed Oct. 11, 2016, entitled "Network Device Storage of Incremental Prefix Trees," by Agarwal et al., the entire contents of which are hereby incorporated by reference for all purposes as if fully set forth herein.

TECHNICAL FIELD

Embodiments relate generally to network devices, and, more specifically, to techniques for prefix-based mapping techniques for forwarding decisions and other applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

The information used by such networking devices to determine how to handle data units based on address information is generally referred to herein as forwarding information. The address information is collectively referred to herein as a "forwarding table" or "policy table." A table may associate an address with policy or rule information that dictates the action(s) that the device is to perform with respect to any data unit that is associated with the address. A network device may be configured to consult different types of forwarding tables for different purposes. For instance, a device may include one table describing policies to apply based on source address information at one network layer, another table describing policies to apply based on destination address information at another network layer, and yet other tables that serve yet other purposes. Note that the term "forwarding table" is a term of convenience, and does not require that the forwarding information actually be stored as a table. That is, though the forwarding information is perhaps easiest to conceptualize in table form, a forwarding table may actually be represented in a variety of forms, such as explained in later sections.

Rather than including a separate record, or entry, for each possible address, a table may be configured such that some entries of the table, or even all entries of the table, specify policy information for different groups of addresses. For example, an entry in an IP-based forwarding table may specify a group of IP addresses and a "next hop" device identifier, indicating that any data unit specifying a destination address that is a part of the specified group of IP addresses is to be forwarded to the specified next hop device. Each group may be referred to as a "subnet."

One common manner of specifying a group of addresses is by a common prefix that each of the addresses shares. Generally, a prefix is a first portion of a data item, such as of a network address. A prefix may be of any length, and thus any given address may have, or "match," multiple prefixes. For example, the prefixes 192, 192.168, and 192.168.1 would all be valid prefixes for the address 192.168.1.1. A table that maps prefixes to other information, such as forwarding instructions, is referred to herein as a prefix table. A forwarding table may thus be implemented as a prefix table.

Many types of network devices process a significant number of data units on a nearly continuous basis. Thus, the speed at which networking devices are able to process received data units can be of great importance. For these reasons and others, forwarding information and other similar data may be stored in a networking device using specialized high-speed memory components, such as content addressable memory (CAM). However, the use of such high-speed memory in networking devices is relatively expensive, both in terms of cost and power consumption. Thus, more efficient techniques for storing and searching forwarding information are desirable, particularly as the number of forwarding entries stored by a networking device grows large.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
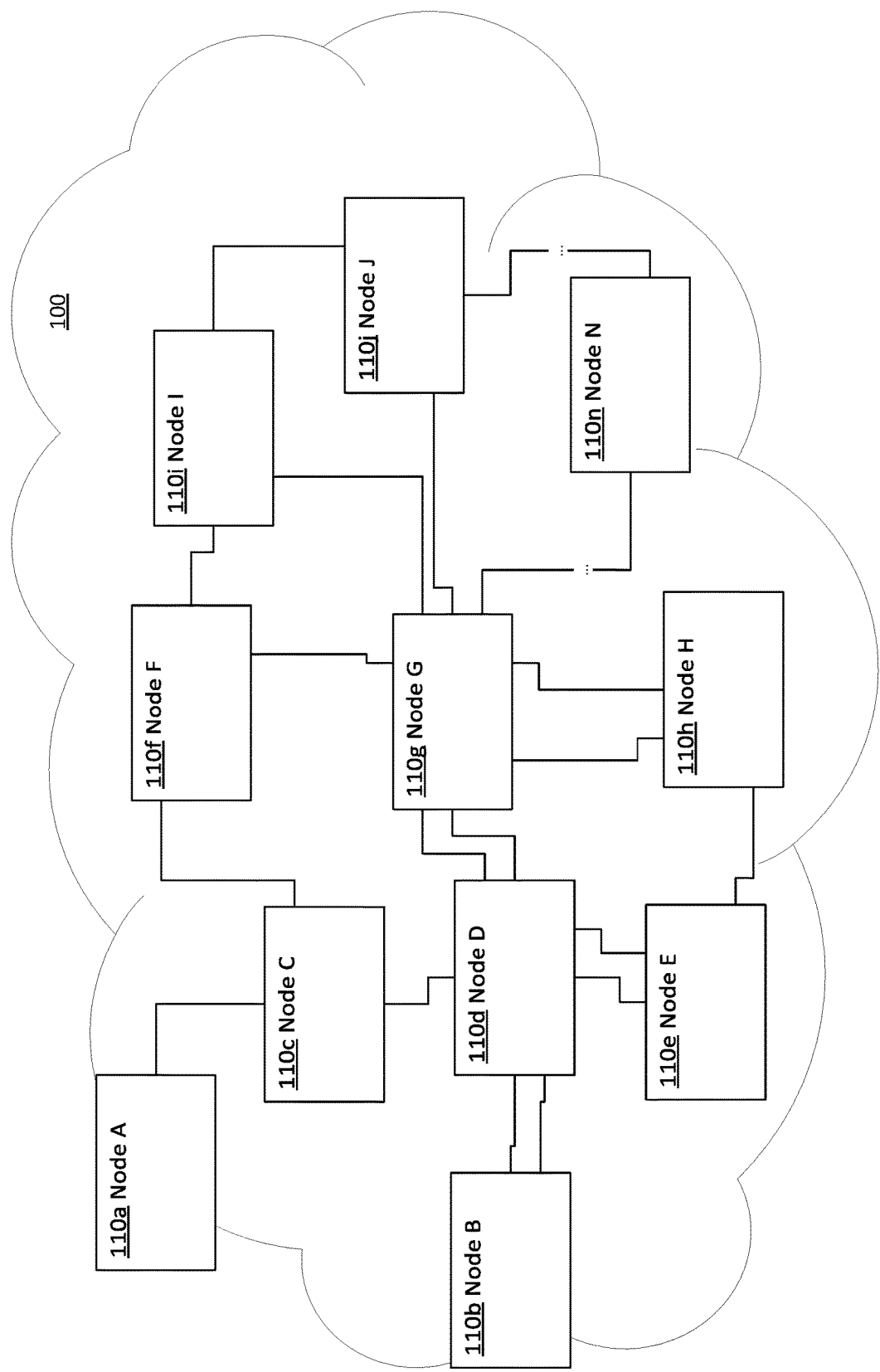
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Network Packets
2.2. Network Paths
2.3. Network Device
2.4. Ports
2.5. Traffic Management
2.6. Forwarding Logic
2.7. Forwarding Table
2.8. Bifurcated Memory Representation of Forwarding Table
2.9. Forwarding Table Optimization Logic
2.10. Miscellaneous
3.0. Functional Overview
3.1. Using the Working Representation of the Prefix Table
3.2. Generating the Working Representation of the Prefix Table
3.3. Adding New Prefix Entries
4.0. Tree-Based Longest Prefix Match Optimization
5.0. Multi-Level Index
6.0. Example Embodiments
7.0. Implementation Mechanism—Hardware Overview
8.0. Extensions and Alternatives 1.0. General Overview Approaches, techniques, and mechanisms are disclosed for maintaining efficient representations of prefix tables for utilization during the operation of a network device. In an embodiment, the performance of a network device is greatly enhanced using a working representation of a prefix table that includes a prefix index and a plurality of associated prefix subsets. In an embodiment, this working representation is bifurcated across a higher-performing memory for the prefix index and a lower-performing memory for the prefix subsets. In an embodiment, management of this working representation is greatly simplified using a sharded prefix tree that is divided into subtrees based on constraints of the memory in which this working representation is stored. In yet another embodiment, a sharded prefix tree may itself be utilized to more efficiently find a longest prefix match for an input key.

In an embodiment, a first portion of the prefix table may be stored in a higher-performing, but potentially more expensive type of memory, such as a ternary content-addressable memory (TCAM). The remaining portion of the prefix table may be stored in a lower-performing, but potentially less expensive type of memory, such as a static random-access memory (SRAM). In an embodiment, an input key, such as the destination address of a network packet, is compared to entries in the first portion to locate the best matching entry in the first portion. This entry serves as an index by which a small subset of prefix entries from the prefix table may be retrieved from the lower-performing memory. The longest prefix match for the input key is guaranteed to be in this small subset, thus avoiding the expense of reading the other subsets of prefix entries from the lower-performing memory, without having to store the entire prefix table in the higher-performing memory.

In an embodiment, to maintain this working representation of the prefix table in such a manner that the small subset of prefix entries is guaranteed to include the longest prefix match, a prefix tree representation of the prefix table is also built. This prefix tree is subdivided into subtrees. For each subtree, there is a separate "index" prefix entry in the higher-performing memory, corresponding to the root node of the subtree. Prefix entries for the subtree are then stored at a location in the lower-performing memory that the prefix entry in the higher-performing memory points to. Virtual nodes may be inserted into the prefix tree for various purposes, such as helping to ensure that subtrees can be adequately sized to fit in their assigned locations within the lower-performing memory. Virtual nodes represent prefixes that are not found in the prefix table, but serve as appropriate indices for organizing the prefix tree into subtrees.

In other aspects, the inventive subject matter encompasses computer apparatuses and/or computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented using application-specific integrated circuits (ASICs) or field programmable gate arrays (FPGAs). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

2.2. Network Paths

Any node in the depicted network 100 may communicate with any other node in the network 100 by sending packets through a series of nodes 110 and links, referred to as a path. For example, Node B (110*b*) may send packets to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

2.3. Network Device

Figure 2:
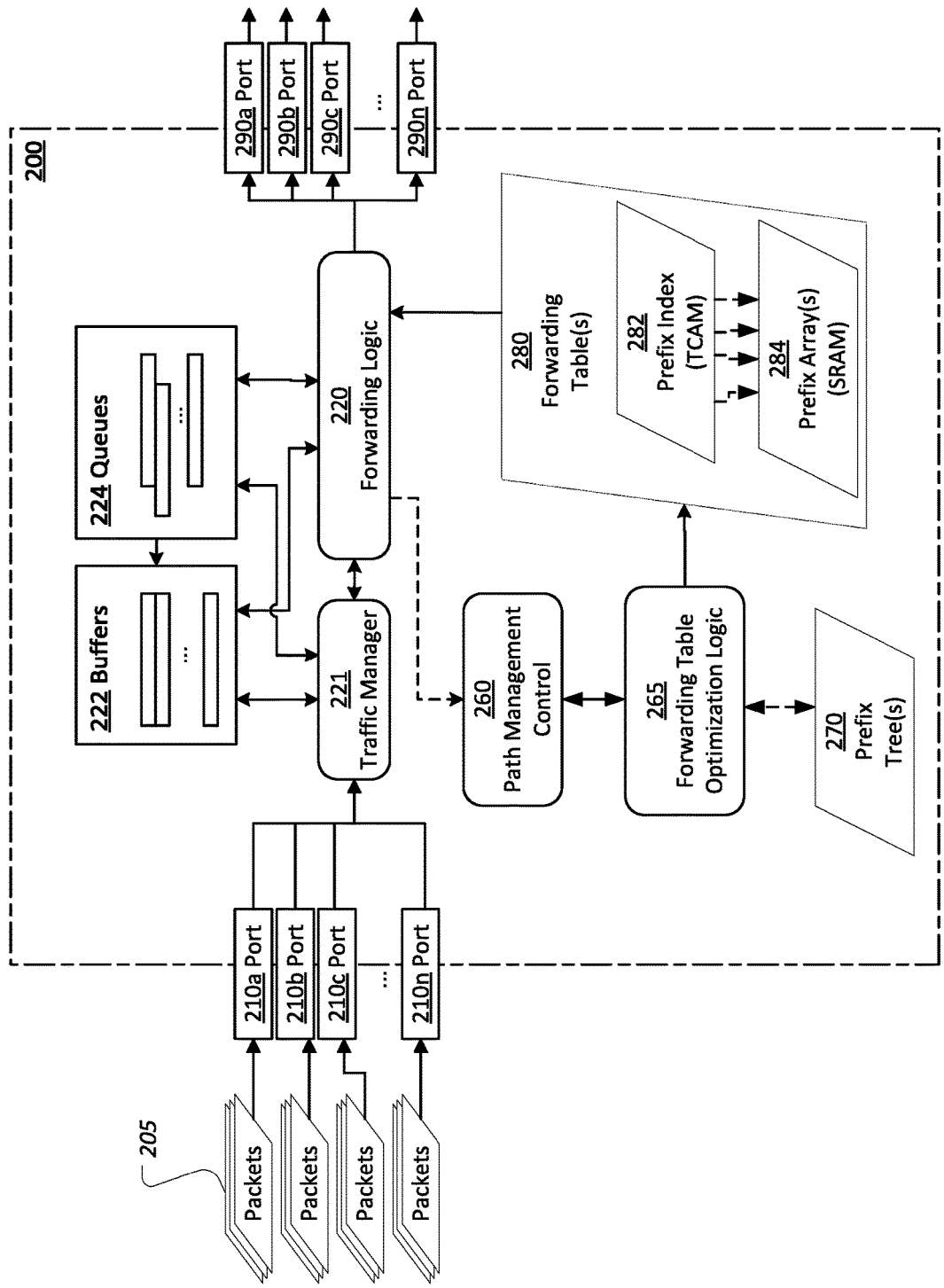
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

2.4. Ports

Network device 200 includes ports 210/290. Ports 210, including ports 210*a-n*, are inbound ("ingress") ports by which data units referred to herein as packets 205 are received over a network, such as network 110. Ports 290, including ports 290*a-n*, are outbound ("egress") ports by which at least some of the packets 205 are sent out to other destinations within the network, after having been processed by the network device 200.

Ports 210/290 are depicted as separate ports for illustrative purposes, but may actually correspond to the same physical hardware ports on the network device 210. That is, a network device 200 may both receive packets 205 and send packets 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single ingress port 210 or egress port 290 into multiple ingress ports 210 or egress ports 290, or aggregate multiple ingress ports 210 or multiple egress ports 290 into a single ingress port 210 or egress port 290. Hence, in various embodiments, ports 210 and 290 should be understood as distinct logical constructs that are mapped to physical ports rather than simply as distinct physical constructs.

2.5. Traffic Management

Since not all packets 205 received by the device 200 can be processed by the packet processor(s) 250 at the same time, a traffic manager 221 of device 200 may store packets 205 in temporary memory structures referred to as buffers 222 while the packets 205 are waiting to be processed. For example, the device's forwarding logic 220 may only be capable of processing a certain number of packets 205, or portions of packets 205, in a given clock cycle, meaning that other packets 205, or portions of packets 205, must either be ignored (i.e. dropped) or stored. At any given time, a large number of packets 205 may be stored in the buffers 222 of the device 200, depending on network traffic conditions.

A buffer 222 may be a portion of any type of memory, including volatile memory and/or non-volatile memory. Device 200 includes a buffer manager configured to manage use of buffers 222 by device 200. Among other processing tasks, the buffer manager may, for example, allocate and deallocate specific segments of memory for buffers 222, create and delete buffers 222 within that memory, identify available buffer(s) 222 in which to store a newly received packet 205, maintain a mapping of buffers 222 to packets 205 stored in those buffers 222 (e.g. by a packet sequence number assigned to each packet 205 as the packet 205 is received), mark a buffer 222 as available when a packet 205 stored in that buffer 222 is dropped or sent from the device 200, determine when to drop a packet 205 instead of storing the packet 205 in a buffer 222, and so forth.

A packet 205, and the buffer(s) 222 in which it is stored, is said to belong to a construct referred to as a queue 224. A queue 224 may be a distinct, continuous portion of the memory in which buffers 222 are stored. Or, a queue 224 may instead be a set of linked memory locations (e.g. linked buffers 222). In some embodiments, the number of buffers 222 assigned to a given queue 224 at a given time may be limited, either globally or on a per-queue basis, and this limit may change over time.

The forwarding logic 220 of device 200 may process a packet 205 over one or more stages. A node may have many queues 224, and each stage of processing may utilize one or more of the queues 224 to regulate which packet 205 is processed at which time. To this end, a queue 224 arranges its constituent packets 205 in a sequence, such that each packet 205 corresponds to a different node in an ordered series of nodes. The sequence in which the queue 224 arranges its constituent packets 205 generally corresponds to the sequence in which the packets 205 in the queue 224 will be processed.

The traffic manager 221 is a component that manages the use of buffers 222 to store packets 205 (or copies thereof), assigns buffers 222 to queues 224, and manages the flow of packets 205 through the queues 224. The traffic manager 221 may, for instance, determine when to "dequeue" packets 205 from queues 224 and provide those packets 205 to specific packet processor(s) of forwarding logic 220. The traffic manager 221 may further identify a specific queue 224 to assign a packet 205 to.

2.6. Forwarding Logic

A device 200 comprises one or more packet processing components that collectively implement forwarding logic 220 by which the device 200 is configured to determine how to handle each packet the device 200 receives. Forwarding logic 220, or portions thereof, may, in some instances, be hard-coded. For instance, specific hardware or software within the node may be configured to always react to certain types of data units in certain circumstances in a certain way. Forwarding logic 220, or portions thereof, may also be configurable, in that the logic 220 changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For example, such attributes or characteristics may include a Quality-of-Service level specified by the data unit or associated with another characteristic of the data unit, a flow control group, an ingress port 210 through which the data unit was received, a tag or label in the packet's header, a source address, a destination address, a packet type, or any other suitable distinguishing property.

In an embodiment, forwarding logic 220 may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic 220 may be configured to implement the associated rules or policies associated with the flow(s) to which a given packet belongs.

Forwarding logic 220 may process a data unit over multiple stages. At each stage, the data unit is placed in a buffer 222, which is said to belong to a queue 224. A device 200 may have many queues 224, and each stage of processing may utilize one or more of the queues 224. At any given processing stage, one or more packet processing components, such as a Field Programmable Gate Array (FPGA), Application-Specific Integrated Circuit (ASIC), or a general purpose processor executing software-based instructions, reads data units from associated queues 224 and determines how to handle the data units.

In an embodiment, different queues 224 may exist for different destinations. For example, each port 210 and/or port 290 may have its own set of queues 224. The queue 224 to which an incoming packet 205 is assigned may therefore be selected based on the port 210 through which it was received, while the queue 224 to which an outgoing packet is assigned may be selected based on forwarding information indicating which port 290 the packet should depart from. A different packet processor may be associated with each different set of one or more queues 224. Hence, the current processing context of the packet 205 may be used to select which queue 224 a packet 205 should be assigned to.

In an embodiment, there may also or instead be different queues 224 for different flows or sets of flows. That is, each identifiable traffic flow or group of traffic flows is assigned its own set of queues 224 to which its packets 205 are respectively assigned. In an embodiment, different queues 224 may correspond to different classes of traffic or quality-of-service (QoS) levels. Different queues 224 may also or instead exist for any other suitable distinguishing property of the packets 205, such as source address, destination address, packet type, and so forth.

For instance, a data unit may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one pair of traffic manager 221 and forwarding logic 220 are depicted, in an embodiment, the traffic manager 221 and forwarding logic 220 are duplicated for some or all of the stages. For example, there may be a traffic manager 221 and forwarding logic 220 for an ingress stage performed upon receipt of a packet 205, a traffic manager 221 and forwarding logic 220 for an egress stage performed upon the packet 205 exiting the system 200, and/or a traffic manager 221 and forwarding logic 220 for any number of intermediate stages. The packet 205 may thus pass through any number of traffic managers 221 and/or forwarding logic 220 prior to exiting the system 200.

An example flow of a packet 205 through device 200 is as follows. The packet 205 may be received by a port 210. The packet 205 is then processed by an initial packet processor (in some embodiments known as a packet pre-processor), and then delivered to a traffic manager 221. Traffic manager 221 stores the packet 205 in a buffer 222 and assigns the packet 205 to a queue 224. Traffic manager 221 manages the flow of the packet 205 through the queue 224 until the packet 205 is released to another packet processor. Depending on the processing, the traffic manager 221 may then assign the packet 205 to another queue so that it may be processed by yet another processor, or the packet processor may send the packet 205 out another port 290.

In the course of processing a packet 205, a device 200 may replicate a packet 205 one or more times. For example, a packet 205 may be replicated for purposes such as multicasting, mirroring, debugging, and so forth. Thus, a single packet 205 may be replicated to multiple queues 224. Hence, though certain techniques described herein may refer to the original packet 205 that was received by the device 200, it will be understood that those techniques will equally apply to copies of the packet 205 that have been generated for various purposes.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

2.7. Forwarding Table

According to an embodiment, forwarding logic 220 reads certain instructions for handling network traffic from one or more tables 280. Generally, tables 280 describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables 280 are described as "forwarding tables," though it will be recognized that the extent of the action(s) described by tables 280 may be much greater than simply where to forward the message. For example, in an embodiment, a table 280 may be a basic forwarding table that simply specifies a next hop for each group. In other embodiments, a table 280 may describe one or more complex policies for each group. Moreover, there may be different types of tables 280 for different purposes. For instance, one table 280 may be a basic forwarding table that is compared to the destination address of each packet, while another table 280 may specify policies to apply to packets upon ingress based on their destination (or source) group, and so forth.

In an embodiment, system 200 comprises path management control logic 260 that is configured to adjust the forwarding instructions described by forwarding table 280 based on a variety of factors. For example, path management control logic 260 may be configured to recognize administrative commands that explicitly instruct the path management control logic 260 to add or remove address groups or adjust existing instructions for a group. Such commands may originate from components that are external to system 200, such as from a system administrator or an administrative device. Such commands may also or instead originate from components that are internal to system 200, such as traffic manager 221 or undepicted flow control components. Path management control logic 260 may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

Prefixes

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic 220 may determine a group of addresses that a data packet is associated with (e.g. a destination subnet, source subnet, etc.) using a prefix, and perform the one or more actions associated with that group.

For example, in the case of IP prefixes, a "slash notation", such as Classless Inter-Domain Routing (CIDR) notation, may be used to express a portion of an IP address that constitutes a prefix portion of the IP address. One example IP prefix may be expressed as "10.172.0.0/16", for instance, where the "/16" syntax indicates that the first 16 bits of the IP address 10.172.0.0 (corresponding to the "10.172" portion) are used to perform matches. The remaining 16 bits of the IP address 10.172.0.0 (the "0.0" portion) is treated as an arbitrary placeholder that is not used for matching. The prefix "10.172.0.0/16" thus matches the IP address "10.172.23.1" because the first 16 bits of both the prefix and IP address, when represented in bit form, are the same, but the same prefix does not match the IP address "10.170.3.28". In other words, a prefix matches an address if the address (when represented as a sequence of bits) begins with the prefix.

Multiple prefix entries may match the same network address. For example, a particular set of IP prefix entries stored by a networking device may include a first prefix entry specifying the prefix "178.0.0.0/8" and a second prefix entry specifying the prefix "178.132.2.0/24." The IP address "178.132.2.11" would match both of these prefixes. In instances where multiple prefix entries match a particular network address, forwarding logic 220 is generally configured to perform only the action(s) associated with the prefix entry specifying the longest prefix (i.e. the more specific prefix). This longest prefix is referred to as a longest prefix match. For instance, in this case, 178.132.2.0/24 is the longest prefix match for 178.132.2.11.

Forwarding logic 220 uses a longest prefix matching ("LPM") algorithm to locate the longest prefix match. At a high level, a longest prefix matching algorithm receives an input "key," often comprising a string, list, or array of numbers, characters, or bits, and determines which prefix from a set of prefixes is the longest prefix matching the input key. A prefix "matches" an input key for the purposes of a longest prefix match algorithm if the input key begins with the prefix. Using an example of an input key and set of prefixes that each comprise a string of letters, each of the prefixes "a", "axj", and "axjiiab" matches a hypothetical input key "axjiiabpo", whereas the prefixes "axy", "bxji", and "xjiiab" do not match the input key. The longest prefix match is the longest prefix that matches the input key.

2.8. Bifurcated Memory Representation of Forwarding Table

In an embodiment, for efficiency of access and/or other purposes, a forwarding table 280 is represented to forwarding logic 220 using certain optimized hardware-based memory structures within system 200. This representation of the forwarding table 280 is also referred to herein as the "working" representation of the forwarding table 280. That is, in an embodiment, to implement the longest prefix match algorithm, forwarding logic 220 need not necessarily access or generate a single "table" structure that stores the complete forwarding instructions of a forwarding table 280. Rather, a collection of data structures collectively store the forwarding instructions of the table 280 in a manner that is more quickly accessible to forwarding logic 220. Hence, in an embodiment, a forwarding table 280 should be understood as a logical construct that is represented or described by this collection of data structures, rather than an actual table structure that is found in system 200.

According to an embodiment, the working representation of a forwarding table 280 includes an index 282, also referred to as a "prefix index," in a first memory, whose entries are linked to different rows in a second memory. Each row in the second memory stores at least one array 284, also referred to as a "prefix array," that stores a different set of prefix entries. Meanwhile, each entry of index 282 stores a beginning prefix portion that is common to all prefixes in the prefix array 284 to which the index entry is linked. In essence, each entry of the index 282 is itself a prefix for a set of prefixes.

Each entry in the index includes a prefix, which may or may not necessarily be one of the prefixes in the forwarding table 280. When searching for a longest prefix match for a given input key, the prefix index 282 is first consulted. The entry in the index 282 whose prefix is the longest match for the input key is then selected from the index 282. Each index entry includes a pointer or address for a memory location in the second memory where the prefix array 284 associated with that index entry is found. Hence, the corresponding prefix array 284 may be read in full or in part, and a longest prefix matching algorithm may then be used to select the prefix entry in the array 284 whose prefix is the longest match for the input key. Because of the manner in which the index 282 and arrays 284 are organized, this longest matching prefix entry is guaranteed to be the longest matching prefix in the forwarding table 280 for the input key, thus saving the expense of reading prefixes found in other arrays 284. The forwarding instructions associated with this longest matching prefix entry are then used to handle traffic associated with the input key.

For example, consider the set of prefixes 192.168.14.0/24, 192.168.18.0/24, and 192.168.19.0/24. Prefix entries for each prefix in this set of prefixes may be stored as part of an array 284 at a certain row within the second memory, while prefix entries for other prefixes, such as 172.0.0.0/8 or 10.0.0.0/4 may be stored in other rows within the second memory. The index 282 may include an index entry for the virtual prefix 192.168.0.0/19, that points to this certain row of the second memory. When the longest matching prefix in the index 282 for an input key (e.g. 192.168.18.4) is 192.168.0.0/19, the input key is then compared to the set of prefixes at this certain row to determine the longest prefix match in the forwarding table for the input key (e.g. 192.168.18.0/24).

Memory Types

For illustrative purposes, the prefix index 282 is illustrated as being stored in a TCAM, while the prefix arrays 284 are depicted as being stored in SRAM. A TCAM is a specialized type of high-speed memory that searches its entire contents in a small number of clock cycles, or even just a single clock cycle. On the other hand, only a portion of an SRAM (e.g. only a small set of rows) can be read in a similar amount of time. Hence, TCAM is significantly more efficient for a longest prefix match algorithm than SRAM. For various reasons, however, placing the entire forwarding table in a TCAM may not be possible or desirable. By leveraging the power of a TCAM for performing an initial lookup that reduces the amount of SRAM that must subsequently be read, the amount of time spent searching for a longest prefix match is significantly reduced.

While particular advantages are realized when the first memory is a content addressable memory and the second memory is a random access memory, it will be realized that advantages will still be present in other embodiments in which the first memory is not necessarily a CAM and/or does not possess the quality of being searched entirely within a small number of clock cycles. Hence, it should be understood that in other embodiments, the TCAM may be replaced by any first memory and the SRAM replaced with any second memory, where the first memory is high-speed and/or more efficiently-accessed than the second memory. For example, in an embodiment, some or all of the first memory may instead include hash-based memory. For instance, there may be a separate hash-based memory for storing indexes corresponding to each of a plurality of different prefix lengths.

Moreover, in an embodiment, certain advantages may still be realized when the index 282 is stored in the same memory as the arrays 284. For instance, relative to conventional prefix tree based approaches, use of an index 282 may reduce the number of comparisons needed to arrive at the longest prefix match in a large prefix tree, by eliminating the need to perform comparisons for most of the prefixes that would normally need to be evaluated while traversing the path in the prefix tree from the root node to the longest prefix match.

Example Working Representation

Figure 3:
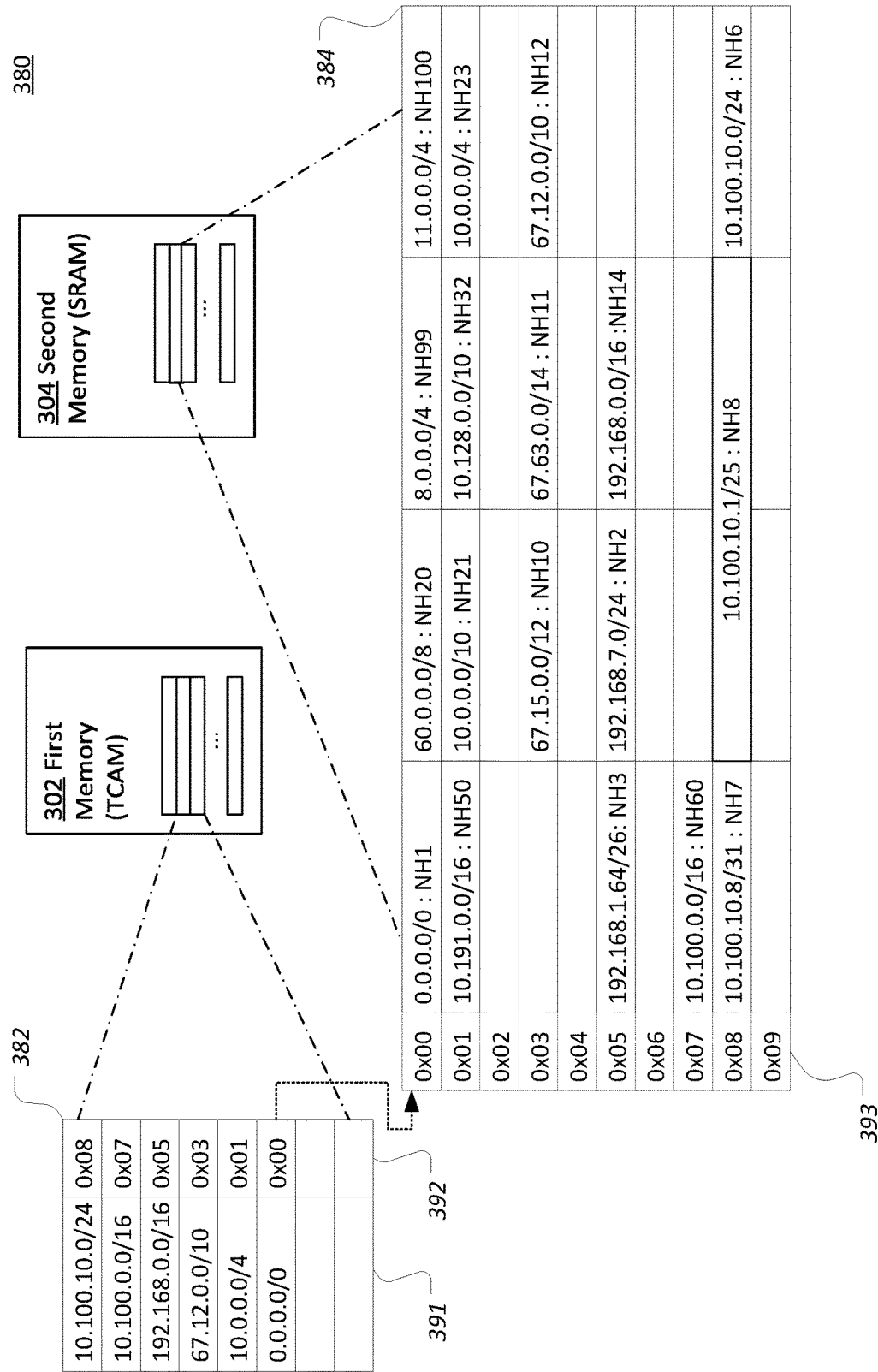
FIG. 3 illustrates an example working representation of a forwarding table stored across a first memory and a second memory.

FIG. 3 illustrates an example working representation of a forwarding table 380 stored across a first memory 302 and a second memory 304, according to an embodiment. Forwarding table 380 is an example of forwarding table 280, though forwarding table 280 may take other forms, and forwarding table 380 may be utilized in systems that differ from system 200.

The first memory 302 (e.g. a TCAM) stores a prefix index 382 in one or more TCAM entries. Each entry of the index 382 stores at least a prefix 391 and an address 392 that indicates the location 393 in the second memory 304 at which the prefix array for the prefix 391 is stored. The size of each TCAM entry may be chosen based on the size of the information to be stored. For instance, for IPv4 prefixes, the size may be thirty-two bits (for the IPv4 address) plus six bits (for the length of the prefix), plus the number of bits necessary to encode addresses in the second memory 304. IPv6 prefixes, on the other hand, may require 128 bits for the IPv6 address and eight bits for the length of the prefix.

In an embodiment, to reduce memory usage, each prefix 391 may be truncated to a certain length, such as to the length of the prefix, cutting off the insignificant bits (e.g. the 0.0 in 10.100.0.0/16). In an embodiment, to better take advantage of this truncation, there may be separate TCAMs for different prefix lengths, and/or rules that dictate what prefix lengths may be stored in a TCAM.

The second memory 304 is divided into addressable units referred to herein as rows 384, which are used to store a collection of prefix arrays. Each row 384 has an address 393, which correlates to one of the addresses 392 specified by the index entries. In an embodiment, each row 384 may be utilized to store any sort of data. That is, some rows 384 may store prefix arrays, while other rows may store other system data. Exactly which rows 384 are allocated to prefix arrays may, in such embodiments, depends on when prefix arrays are created and what is already stored in memory 304 at that time. In yet other embodiments, the second memory 304 is dedicated exclusively to storing prefix entries.

A row 384 may store any number of prefix entries, depending on the sizes of the prefix entries, the sizes of the rows 384, and any constraints imposed by the manner in which entries are stored in the rows 384. For instance, in an embodiment, one such constraint may be that each entry must be stored in a different set of one or more discrete blocks within the rows 384. It will be recognized that a variety of similar space allocation and management constraints may also or instead limit the space available within a row 384 to store an entry.

For example, as illustrated, the first entry of row 0x00 stores the prefix 0.0.0.0.0/0 along with the forwarding instructions "NH1." "NH1" is a placeholder used for illustrative purposes, and the forwarding instructions may themselves be longer. For instance, the forwarding instructions may indicate one or more "next hop" addresses, actions to perform, and so forth. Or, in an embodiment, "NH1" may be a pointer or other reference to forwarding instructions stored in another location.

In an embodiment, prefix entries may be added (assuming space is available) or removed from a row 384 over time for various reasons, such as the addition or removal of new routes or forwarding instructions, re-optimization of the storage of the prefixes in memory 302/304, and so forth. Moreover, in an embodiment, the order of prefix entries in a row 384 may or may not be sorted by prefix length, depending on the embodiment.

In an embodiment, to further conserve storage, only the incremental portion of a prefix, relative to that which is stored in the corresponding entry of index 382, need be stored in the second memory 304. For example, in row 0x05, since the prefix in the corresponding entry of index 382 is of prefix length sixteen, the first sixteen bits of each prefix in row 0x05 must be the same, and therefore need not be repeated in row 0x05. Thus, for instance, the prefix 192.168.1.64/26 may be represented in the row 0x05 as simply "1.64/26," with the first sixteen bits derived from the index 382. Of course, to reduce storage needs even further, the insignificant bits of each prefix may be truncated, such that 192.168.7.0/24 becomes simply 7/24, since the last eight bits are not needed.

To illustrate the use of forwarding table 380 in determining a longest prefix match, consider the input key 192.168.7.78. A longest prefix match would initially be selected from the index 382. In this case, though 0.0.0.0/0 is a match for the input key, 192.168.0.0/16 is the longest prefix match in the index 382. The address 392 is then read from the index entry for 192.168.0.0/16. This address 392 is 0x05. Hence, the prefix array in the row 384 at address 0x05 is read, and a longest prefix match is selected from this row 0x05. In this case, 192.168.7.0/24 is the longest prefix match. Hence, the forwarding instructions "NH2" are loaded and processed for the input key.

Note that prefixes found in index 382 are repeated in their corresponding row 384, so that their forwarding instructions may be located if they are the longest prefix match for the input key. Alternatively, the forwarding instructions for a prefix in index 382 could be stored in a separate column of the first memory 302, and thus the prefix would not need to be repeated. In this case, if there were no matching prefix for an input key in a prefix array, the forwarding instructions from the matching index entry would be used instead.

2.9. Forwarding Table Optimization Logic

Returning now to FIG. 2, to generate and optimize the working representation of table 280, system 200 comprises forwarding table optimization logic 265. The forwarding table optimization logic 265 receives data from path management control logic 260 that indicates changes to the forwarding instructions within the table 280, and makes changes to index 282 and/or arrays 284 to reflect these changes. The changes may include adding a new prefix entry to a row of the second memory, deleting an entry in a row of the second memory, moving one or more entries to new rows of the second memory, changing forwarding instructions associated with a prefix entry, adding or removing index entries, changing rows to which the index entries point, and so forth.

Prefix Tree

To determine what changes must be made to the prefix arrays 284 and/or index 282 to implement the requested changes to the forwarding table 280, forwarding table optimization logic 265 maintains a separate, graph-based representation of the forwarding instructions within forwarding table 280, referred to herein as a prefix tree 270. The prefix tree 270 is a directed graph structure that is relatively simple to manipulate, but relatively expensive to access compared to the working representation of the forwarding table 280. The prefix tree 270 may be stored in any suitable memory, and, in an embodiment, is stored as a software-based data structure within a random-access memory. In an embodiment, the prefix tree 270 is a trie, though alternative tree structures may be utilized in other embodiments.

A prefix tree 270 comprises a plurality of linked nodes, including a root node, leaf nodes, and intermediate nodes. Each node except for the root node has one parent node. The root node and intermediate nodes further have one or more child nodes. In some embodiments, each node may have a maximum of two child nodes, though the techniques may be adapted to embodiments where more child nodes are possible.

Each node corresponds to a prefix. Each child node descends from a parent node that corresponds to a shorter prefix. The prefix of the child node begins with the prefix of its parent node, but further includes one or more additional elements (e.g. bits, numbers, etc.). Each prefix entry in forwarding table 280 is represented by a node. Moreover, in an embodiment, some nodes may be "virtual nodes" that do not correspond to prefix entries in forwarding table 280, but rather correspond to a "virtual" prefix that links a set of child nodes by a beginning portion that they have in common. To differentiate between node types, nodes that correspond to actual prefix entries in forwarding table 280 are referred to herein as "real" nodes. The root node is either a real node that corresponds to the shortest prefix in the forwarding table 280, or a virtual node.

Figure 4:
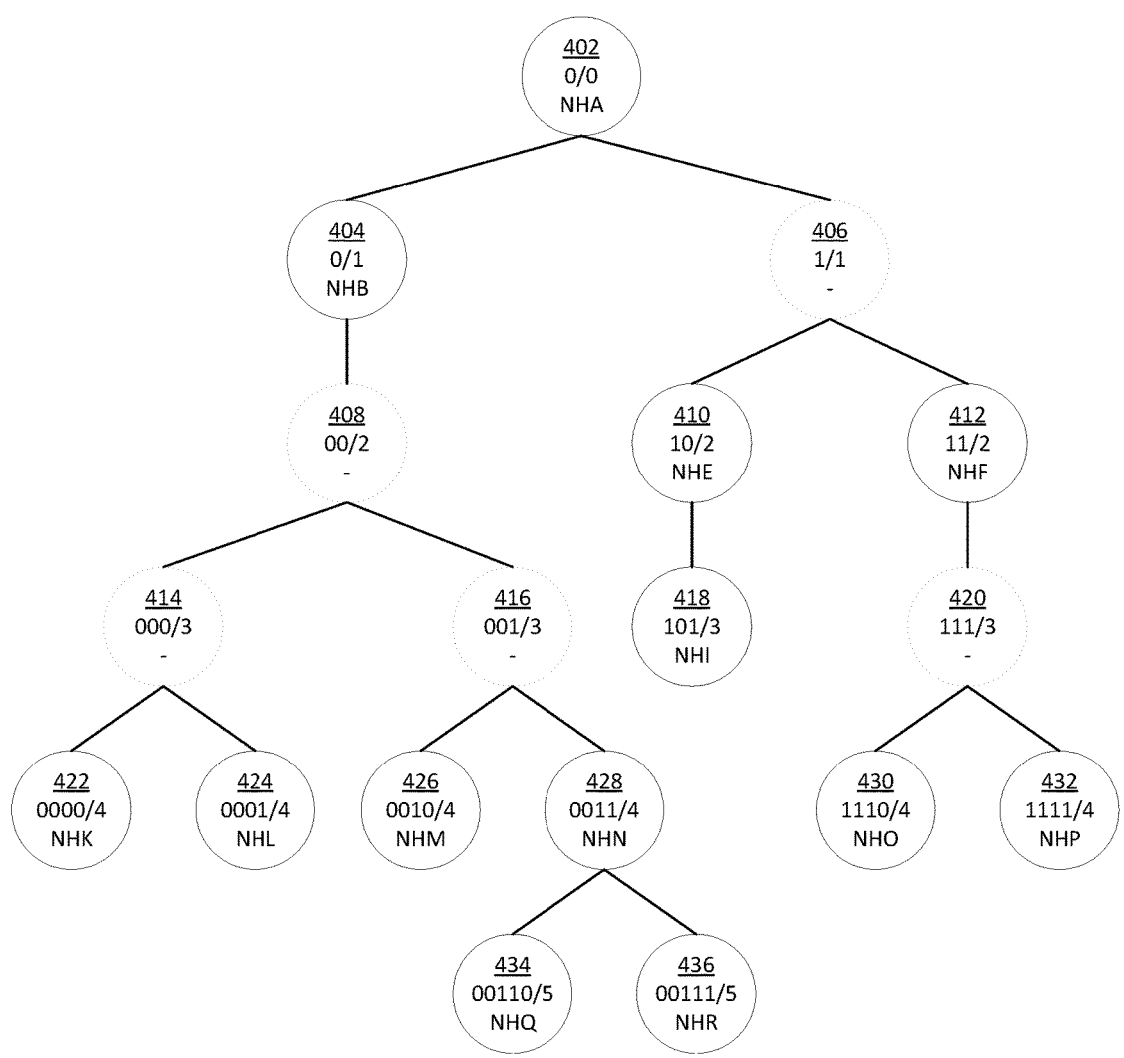
FIG. 4 illustrates an example prefix tree.

FIG. 4 illustrates an example prefix tree 400 comprising nodes 402-436, according to an embodiment. Prefix tree 400 is an example of a prefix tree 270. However, prefix tree 400 and similarly arranged data structures may also be utilized for practicing the described techniques in systems other than system 200.

Each of nodes 402-436 is associated with a different prefix. For ease of illustration, the depicted prefixes are sequences of bits followed by a slash and a corresponding prefix length. It will be recognized that these sequences of bits may be truncated binary versions of other types of prefixes. For instance, the prefix 0/0 represented by node 402 may be a truncated version of the IPv4 prefix 0.0.0.0/0, while the prefix 1/1 represented by node 406 may be a truncated version of the IPv4 prefix 128.0.0.0/1.

For further illustration, some nodes include "next hop" destinations, such as "NHA" or "NHP." These nodes are the "real" nodes of the tree, and correspond to prefix entries in the represented forwarding table. Other nodes do not include such forwarding information. These nodes, which are outlined in dots rather than solid lines, are virtual nodes in the tree 400. These virtual nodes are created for various reasons.

For example, virtual nodes may be created to ensure that no node has more than a certain number of children (e.g., as illustrated, no more than two children). For instance, consider nodes 410 and 412, which correspond to prefixes 10/2 and 11/2, respectively. These are both "real" nodes that correspond to actual prefix entries. The only matching "real" node within tree 400 is node 402, corresponding to prefix 0/0. Were there no limit on the number of children nodes per parent node, node 402 would thus serve as a parent node for nodes 410 and 412. However, node 402 already has one child—node 404—which corresponds to prefix 0/1. Since nodes 410 and 412 cannot be added as children of node 402 without exceeding the maximum of two children for node 402, a virtual node 406 is created. This virtual node 406 is inserted between nodes 402 and nodes 410/412—i.e., as a child node of node 402, and as a parent node of nodes 410 and 412. Virtual node 406 is assigned a prefix that is longer than that of node 402, but still matches those of nodes 410 and 412. In this case, that prefix is 1/1.

As another example, consider nodes 426 and 428, which correspond to the prefixes 0010/4 and 0011/4, respectively. Were it not for the nodes of tree 400 being restricted to two children, nodes 426 and 428 could both be direct children of real node 404, since nodes 426 and 428 both begin with the prefix 0/1, and there are no other real prefixes of longer length from which they could descend. However, since nodes 422 and 424 could also descend from node 404, various virtual nodes of intermediate lengths are created between node 404 and nodes 422-428. Hence, a prefix that is common to nodes 426 and 428—001/3—is determined, and a virtual node 416 is created to represent this virtual prefix. Nodes 426 and 428 then descend from virtual node 416 instead of real node 404.

Another example reason for creating a virtual node is to create a node that can serve as an index node for a new subtree, as is described in the next section.

Note that, although the level of each node in prefix tree 400 corresponds to the length of its prefix, this is merely the result of the selected set of prefixes in tree 400, and need not always be the case.

Subtrees

Returning to FIG. 2, forwarding table optimization logic 265 divides prefix tree 270 into subtrees at the root node and at various "edges" between selected children and parent nodes. Each subtree is a tree, in and of itself, comprising a different and non-overlapping subset of the nodes in prefix tree 270. Each node of the prefix tree 270 is in one and only one subtree. Each subtree has a single node at its root, which node is referred to herein as an "index" node. The remaining nodes in the subtree all descend from the index node in the prefix tree 270 (i.e. are all part of the same branch). A subtree does not necessarily include all the nodes that descend from the index node within the prefix tree 270, as new subtrees may begin at any level within the prefix tree 270, and may break off of branches that belong to other subtrees. A tree divided in this manner may also be referred to as a sharded tree.

Figure 5:
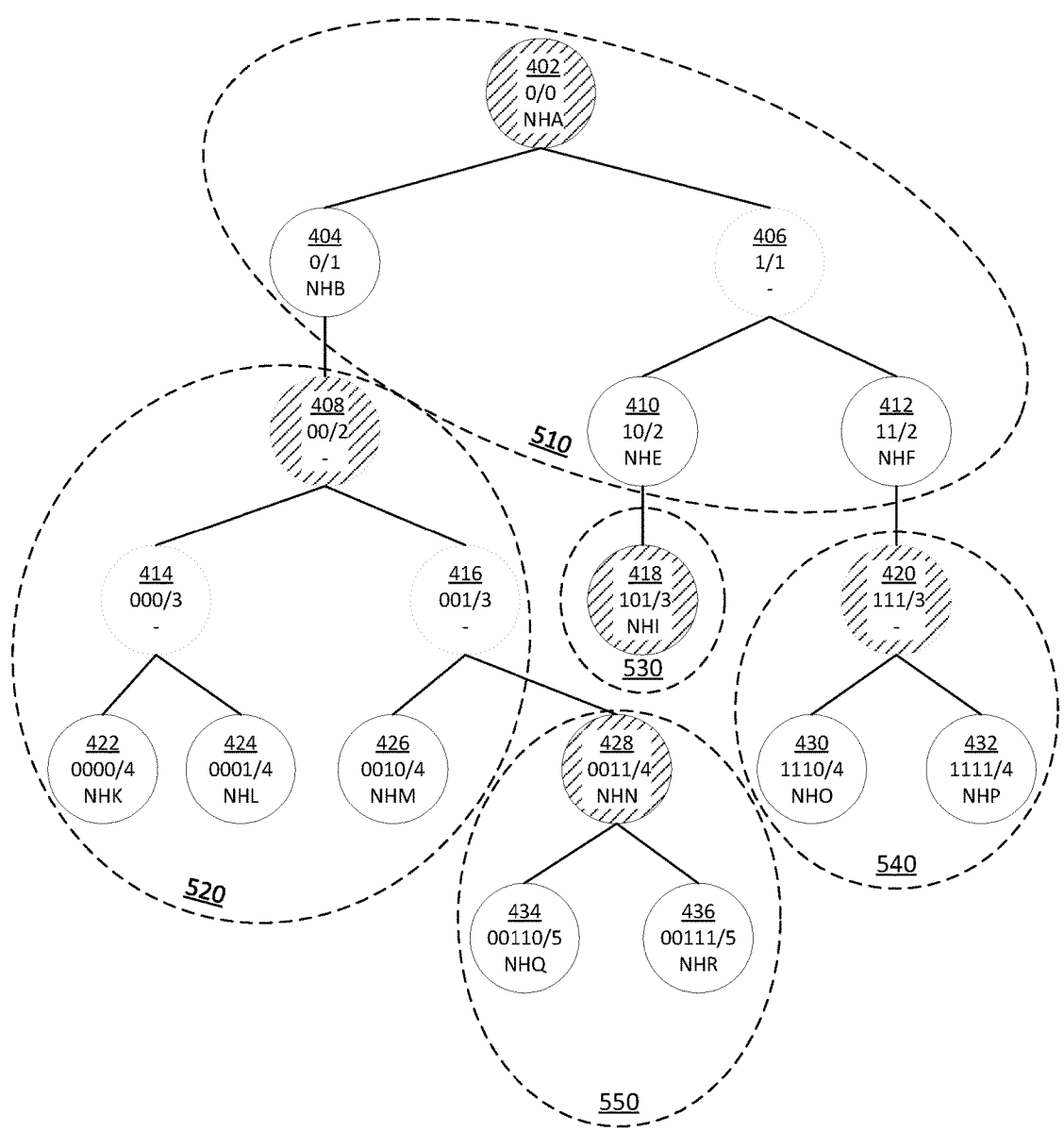
FIG. 5 illustrates one possible arrangement of subtrees created from dividing the example prefix tree of FIG. 4.

For example, FIG. 5 illustrates one possible arrangement 500 of subtrees created from dividing the example prefix tree 400, according to an embodiment. Note that arrangement 500 is only one way in which prefix tree 400 may be divided. Prefix tree 400 may be divided in a variety of other arrangements depending on the specifics of the implementing system and on the state of the system.

Nodes 402-436 are divided into five subtrees 510-550, of varying sizes. Each subtree 510-550 includes an index node, as indicated by shading of that node in FIG. 5. For example, node 402 is the index node for subtree 510, while node 408 is the index node for subtree 520. Subtree 530 consists of a single node 418.

As previously stated, node 408 is a virtual node. Node 408 may have been created so as to make it possible to create a subtree that included nodes 422-426, but not node 404. Since each subtree needs a single root node to serve as its index node, without the creation of virtual node 408, there would have been no single node which could have served as a root node for a subtree that included nodes 422-426.

Mechanisms for dividing a prefix tree into subtrees are described in subsequent sections.

Prefix Tree Translation Logic

Again returning to FIG. 2, forwarding table optimization logic 265 utilizes the resulting arrangement of subtrees within the prefix tree 270 to generate the working representation of the forwarding table 280. That is, forwarding table optimization logic 265 includes translation logic for translating the prefix tree 270 into the working representation of the forwarding table 280. This logic need not translate the entire prefix tree 270 all at once, but rather may make incremental changes to the working representation over time to keep the working representation synchronized with the prefix tree 270.

The translation logic is configured as follows. Each subtree forms a prefix array 284, which is then stored in a different row within the second memory. Any real nodes within the subtree become prefix entries in the corresponding prefix array. Each prefix entry is stored in the corresponding row, as explained elsewhere. The nodes may or may not be sorted within the prefix array 284 by prefix length, subtree depth, and/or other factor(s), depending on the embodiment.

Depending on the embodiment, virtual nodes within a subtree may or may not be placed in the prefix array 284 for that subtree. In an embodiment, if the index node is a virtual node, it is included in the prefix array 284. That is, in such an embodiment, one may choose to place any or all virtual nodes for a subtree in the prefix array 284 that stores the subtree, but it is only mandatory to store index virtual nodes in prefix arrays 284. The forwarding instructions stored in the prefix entry for a virtual node may either be a copy of the forwarding instructions for the parent node of the virtual node, or a reference to a location at which the forwarding instructions for the parent node are stored.

Each index node becomes an entry in the index 282. The index entry for an index node includes at least the address at which the prefix array 284 for the corresponding subtree is stored.

Figure 6:
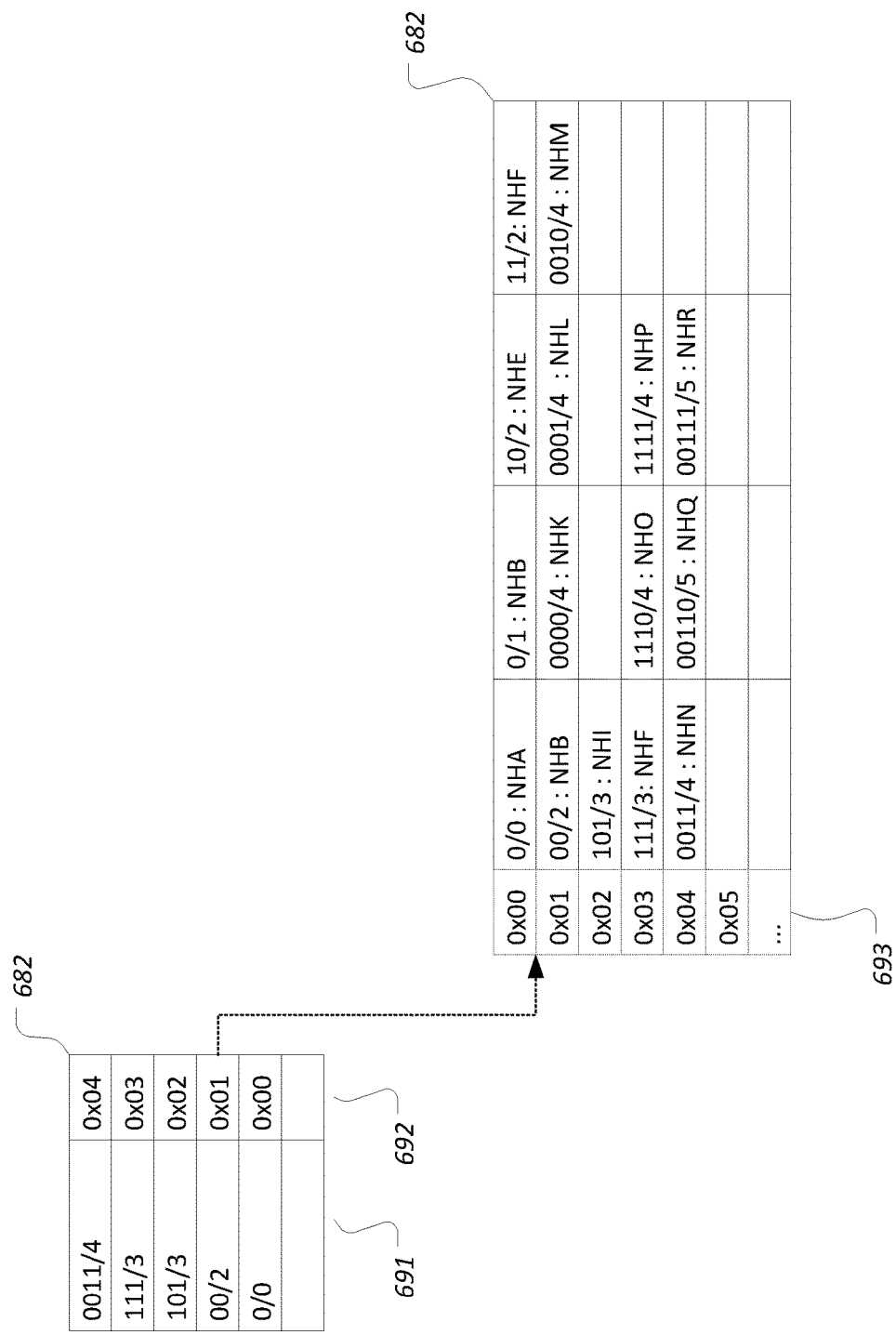
FIG. 6 illustrates an example working representation for the example prefix tree of FIG. 4 in accordance with the example arrangement of FIG. 5.

FIG. 6 illustrates an example working representation 680 for the example prefix tree 400, in accordance with the arrangement 500, according to an embodiment. The representation includes a different index entry 682 for each subtree's index node. Each index entry 682 includes a prefix 691 and an associated reference 692 to a memory location, in similar manner to that explained with respect to FIG. 3.

The representation further includes prefix entries in a plurality of rows 682, in similar manner to the rows 382 of FIG. 3. The memory reference 692 of an index entry 682 points to the address 693 of a row 682 where the prefix entries for the nodes in the associated subtree are stored.

For example, subtree 520 is represented by the combination of an index entry for the virtual node 408 (i.e. the fourth index entry, or 00/2), and the row 0x01, to which that index entry points. Row 0x01 includes four prefix entries, representing nodes 408, 422, 424, and 426 respectively. Note that prefix entries for nodes 414 and 416 are not included in row 0x01 because they are non-index virtual nodes, which do not need to be included in the working representation, according to the depicted embodiment.

Subtree Division Logic

Returning again to FIG. 2, forwarding table optimization logic 265 includes subtree division logic for dividing a prefix tree 270 into subtrees. In some embodiments an optimal arrangement of subtrees may be computed from scratch each time prefix entries are added, removed, or altered. In other embodiments the subtree division logic includes incremental manipulation logic that "generates" the arrangement by making minor adjustments to the existing arrangement of subtrees any time prefix entries are added, removed, or altered. Optionally, embodiments with incremental manipulation logic may further include background optimization logic that, at regular or irregular intervals, examines multiple subtrees, or even the entire prefix tree 270, and reorganizes the prefix tree 270 more optimally.

In any case, the subtree division logic is based on memory constraints associated with storing the index 282 and/or prefix arrays 284. A first such constraint is that each subtree comprises no more nodes than can be stored in a single prefix array 284. In an embodiment, in accordance with this restraint, the number of nodes in each subtree may be a fixed number, such as the maximum number of members of a prefix array 284. In an embodiment, the number of nodes in a subtree is no more than can be stored within a row in the second memory. In some embodiments, this number may vary from subtree to subtree based on the complexities of their respective prefix entries (i.e. the amount of space required to store each entry). In other embodiments, this number may be fixed. For example, each row may include a fixed number of slots or blocks, and each slot or block may store a single prefix entry.

In an embodiment, for the purposes of determining how many nodes can be stored in a prefix array 284, any node that does not need to be stored in a prefix array 284 is ignored. For example, in embodiments where non-index virtual nodes need not be stored in the prefix array 284, any virtual node other than the index node of a subtree may be ignored. Hence, whereas the number of real nodes in a subtree may be subject to memory-based constraints, no such constraints are imposed on the number of virtual nodes in the subtree. In another embodiment, no distinction between virtual nodes and real nodes is made for purposes of determining the number of nodes in a subtree.

Another constraint may be the desired size of the index 282. As described above, each subtree corresponds to a different entry in index 282. In an embodiment, it is desirable to keep the number of entries in index 282 relatively low, so as to reduce the amount of the first memory needed to store the index 282. Accordingly, in an embodiment, forwarding table optimization logic 265 is configured to divide the prefix tree 270 in such a manner that most of the subtrees will hold close to their maximum number of nodes, thus reducing the number of subtrees. However, forwarding table optimization logic 265 need not necessarily be configured to ensure that most subtrees reach their maximum size, as the complexity of the logic necessary to make such assurances may compromise the efficiency of forwarding table optimization logic 265 in updating the forwarding table 280.

In other embodiments, and/or in certain contexts, it may be desirable that a certain number of entries in index 282 are utilized. For instance, a fixed number of TCAM entries may exist for the forwarding table 280, and it may be desirable that as many of these entries be used as possible. In such an embodiment, forwarding table optimization logic 265 may be configured to initially create as many subtrees as possible before adding nodes to existing subtrees. Or, in an embodiment, space within the first memory may be allocated in blocks of certain sizes (e.g. blocks of four entries, sixteen entries, etc.). When blocks are newly allocated for the index 282, forwarding table optimization logic 265 may be configured to create as many subtrees as possible within the newly allocated block(s), and then begin adding nodes to existing subtrees.

In embodiments where the subtrees are manipulated incrementally over time, the arrangement of subtrees evolves organically as changes occur, and hence the arrangement of subtrees for the same prefix tree 270 may differ depending on the order in which nodes were added or removed from the prefix tree 270.

Yet other memory constraints may exist in certain embodiments. For example, in an embodiment, the subtree division logic is configured to employ relatively simple manipulation logic at times when there is less bandwidth available to read and/or write to the working representation and/or when there are less processing resources available. This simple manipulation logic may produce a less optimal working representation. At other times, the background optimization logic may re-evaluate the prefix tree 270 to make more optimal adjustments.

Example manipulation mechanics are now examined with respect to several example incremental operations on the illustrative arrangement 500 of prefix tree 400.

First, consider the addition of a prefix entry for the prefix 0011001/7. The longest matching existing prefix for this new prefix is prefix 00110/5, which corresponds to node 434. Hence, the new node for 0011001/7 may be added as a child of node 434. The subtree division logic may then consider whether the new node should be added to same subtree as its parent node 434 (i.e. subtree 550). Assuming that the subtree division logic is configured to minimize the number of subtrees, and further assuming that the prefix entry for 0011001/7 will fit within the remaining space available in row 0x04 of FIG. 6, then the new node may be added to subtree 550. Otherwise, a new subtree should be created for the new node.

Of course, if minimization of the number of subtrees is a goal, there are more optimal manners to arrange the prefix tree 400 than adding a new subtree for the new node. However, to increase system responsiveness, this simple approach may be taken for the initial addition of the new node, and more complex optimizations may be made in the background at a later time.

Further suppose that a prefix entry for 1101/4 is added. This new node would be created under node 412, corresponding to the prefix 11/2. The new node could not be stored with the subtree 510, since row 0x00 is full. Instead, a new subtree may be created for the new node. If a prefix entry for 1100/4 were then added, a virtual node for the virtual prefix 110/3 would need to be created, so as to avoid more than two children for node 412. The virtual node would be the parent for both 1101/4 and 1100/4, and would take over as the index node for the new subtree.

Now consider the deletion of the prefix 10/2. The immediate result of the deletion is simply to remove the corresponding entry from row 0x00, and make node 418 a direct child of virtual node 406. However, a background process may subsequently observe that subtree 530 may be merged with subtree 510. The prefix entry for node 418 may thus be copied into the space that formerly held the prefix entry for node 410. The index entry 682 for subtree 530 or index node 418 may then be deleted, and row 0x02 is then deallocated and made available for other uses (e.g. storing new prefix arrays).

The above example mechanics illustrate the operation of but one example of suitable subtree division logic. Other subtree division logic may take other forms in other embodiments, including simpler or more complex forms designed around potentially different constraints.

2.10. Miscellaneous

Device 200 illustrates only one of many possible arrangements of components configured to provide the functionality described herein. Other arrangements may include fewer, additional, or different components, and the division of work between the components may vary depending on the arrangement. For example, in an embodiment, forwarding table 280 is more generally a prefix table that may be utilized for purposes other than processing network packets. Hence, for example, the forwarding table optimization logic may be more generally characterized as prefix table management logic, the forwarding logic may more generally be characterized as data handling logic, and many other components of system 200 may even be omitted.

For illustrative purposes, this disclosure describes a number of embodiments with respect to the context of forwarding policies that are applied based on matching destination IP addresses (e.g. IPv4 or IPv6) to IP prefixes. However, the same techniques are also applicable to applying any type of policy, based on matching other types of prefixes to other type of network packet information, including, but not limited to, source or other IP addresses, media access control (MAC) addresses, proprietary network addresses, other packet metadata, etc. In fact, in other embodiments, the prefixes may be prefixes of any type, including strings or numbers other than addresses. The techniques may thus be generalized to locating a "longest prefix matching" data entry for any type of input string, and taking an associated action based thereon.

In an embodiment, a single row may store multiple prefix arrays. Hence, multiple index entries may point to the same row. Storing multiple prefix arrays in a single row may be useful for consolidating storage of smaller and unconnected subtrees. For instance, subtrees 530 and 550 of FIG. 5 might be stored in a single row 682 instead of in rows 0x02 and 0x04. In an embodiment, the subtree management logic may take the existence of multiple prefix arrays within a single row into consideration when determining if there is room in a row to store another prefix entry. In an embodiment, each prefix entry may be tagged or otherwise associated with some label indicating which subtree and/or index node the prefix entry is associated with.

3.0. Functional Overview

The various elements of the process flows described below may be performed in a variety of systems, including systems such as system 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Using the Working Representation of the Prefix Table

Figure 9:
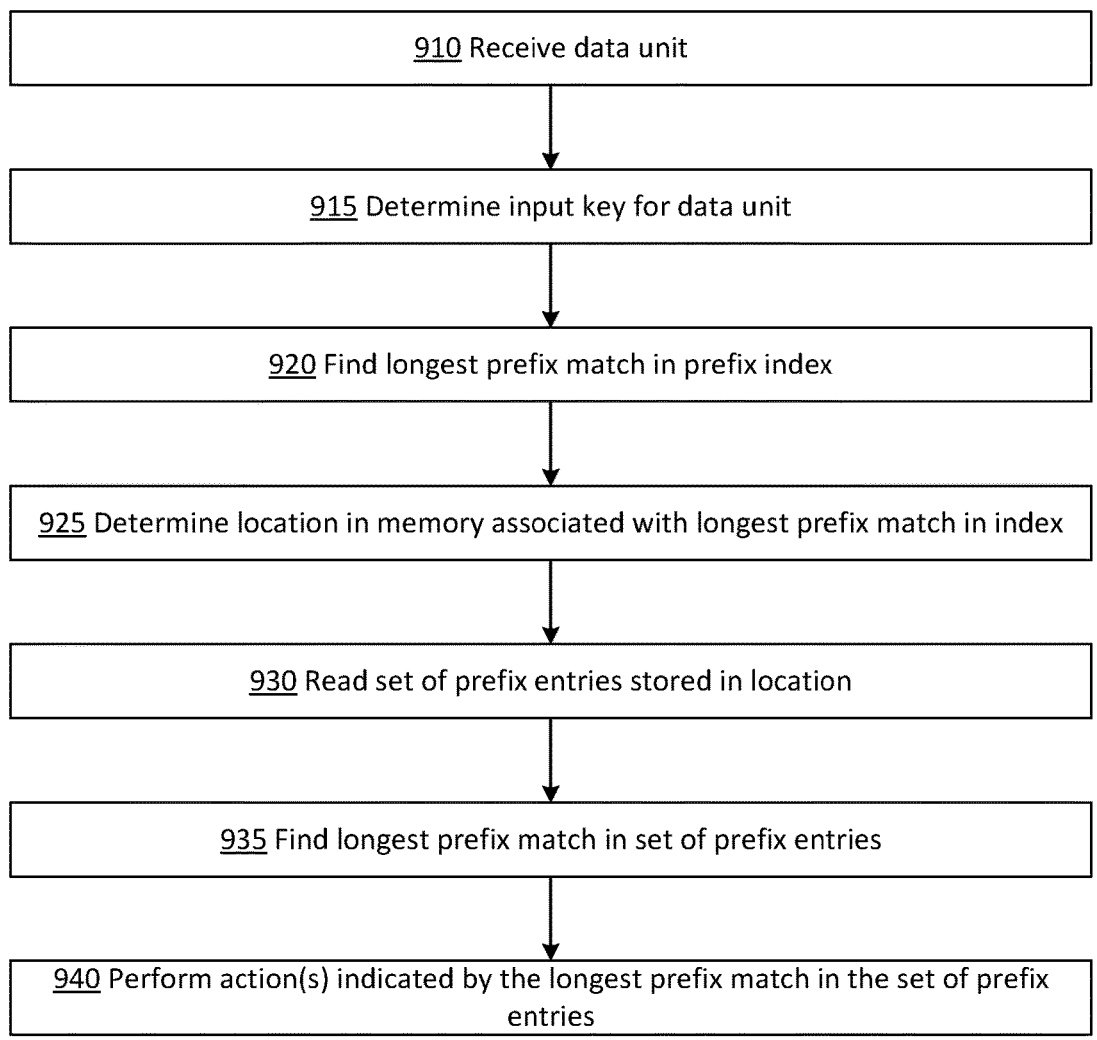
FIG. 9 illustrates an example flow for handling a data unit using a prefix table represented in the bifurcated manner described herein.

FIG. 9 illustrates an example flow 900 for handling a data unit using a prefix table represented in the bifurcated manner described herein, according to an embodiment.

Block 910 comprises receiving a data unit for processing. The data unit may be any sort of data unit, received by any suitable component of the implementing system. For example, in an embodiment, the data unit may be a network packet or frame sent from an external device or otherwise relayed to the forwarding logic of the implementing device.

Block 915 comprises determining an input key for the data unit. The input key is used to classify the data unit for the purposes of determining one or more actions for processing the data unit. For instance, if the data unit is an IP packet, the input key may be a destination IPv4 or IPv6 address specified in the header of the packet, and will be used to determine a next hop address for the data unit and/or other forwarding instructions. Of course, other input keys may also or instead be derived for other types of purposes. Flow 900 may be utilized for determining actions related to any suitable type of input key, including source addresses, hash values, flow identifiers, or other identifiers.

Block 920 comprises searching for a longest prefix match for the input key in a prefix index of a prefix table, such as in the prefix index 282 for a forwarding table 280. In an embodiment, the prefix index is stored in a memory, such as a TCAM or hash memory, that can be searched for a longest prefix match relatively quickly. In an embodiment, the prefix index is sorted, such that the first matching entry in the prefix index is the longest prefix match in the prefix index.

Block 925 comprises identifying a memory location associated with longest matching entry in the prefix index. For example, the longest matching entry in the prefix index may specify an address of a row, block, or other addressable unit of data within another memory, such as an SRAM.

Block 930 comprises reading a set of prefix entries stored in this location. For instance, the set of prefix entries may be a prefix array 284 that is stored within the identified location. The set is merely a subset of prefix entries in the prefix table. The set includes all prefix entries that begin with the prefix of the prefix index entry found in block 920.

Block 935 comprises finding the longest prefix match in the set of prefix entries. On account of the manner in which prefix table is stored, the longest matching prefix entry within the set is also the longest matching prefix entry within the table, even though not all prefix entries in the prefix table are searched.

In an embodiment, blocks 930 and 935 occur at least partially concurrently. The set of prefix entries is sorted by length, such that the first match found will be the longest prefix match. In this case, the remainder of the set of prefix entries need not actually be read. However, in other embodiments, the prefix entries will not necessarily be sorted, and the entire set must be read.

Block 940 comprises performing one or more actions indicated by the longest matching prefix entry identified in block 935. For instance, if the actions are forwarding instructions, block 940 may comprise sending the data unit to a next hop indicated by the forwarding instructions, or performing other actions such as described in other sections.

Flow 900 illustrates only one of many possible flows for handling a data unit using a prefix table represented in the bifurcated manner described herein. Other flows may include fewer, additional, or different elements, in varying arrangements.

3.2. Generating the Working Representation of the Prefix Table

Figure 10:
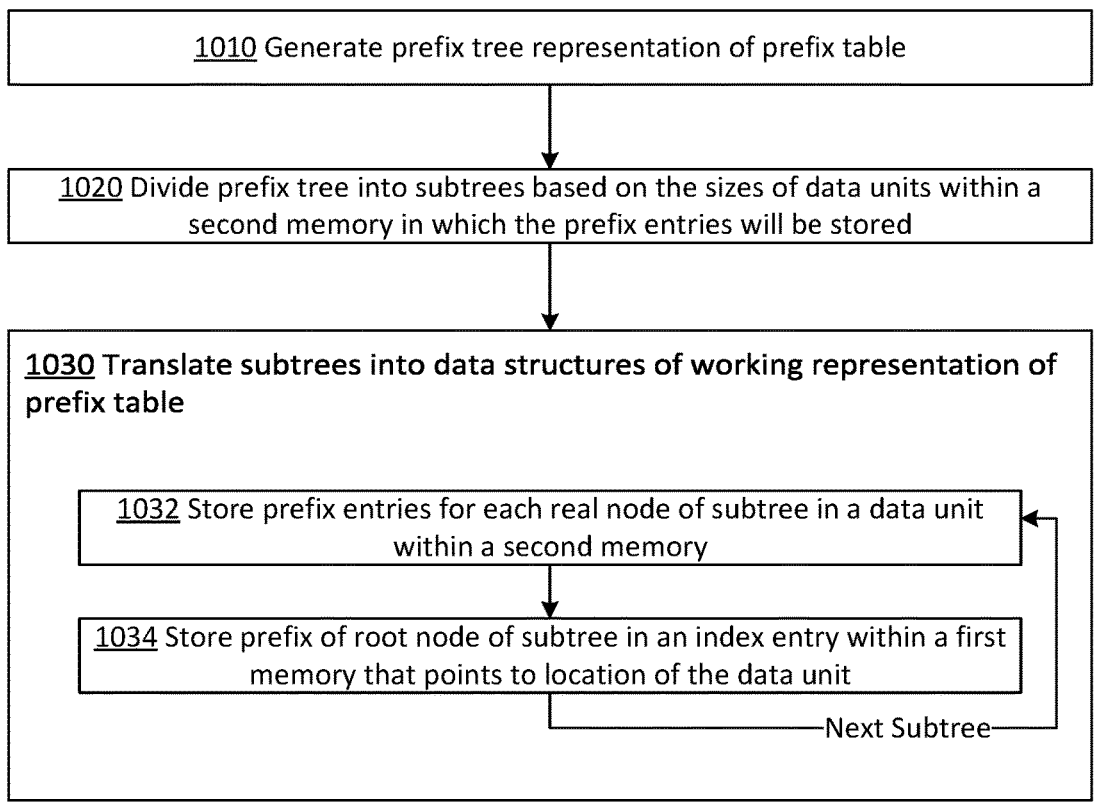
FIG. 10 illustrates an example flow for generating a working representation of a prefix table such as described herein.

FIG. 10 illustrates an example flow 1000 for generating a working representation of a prefix table, such as the working representation of forwarding table 280 described herein, according to an embodiment. Flow 1000 may be performed at various times, such as upon starting or resetting a network device, or in response to identifying changes that need to be made to the represented prefix table. In an embodiment, flow 1000 is performed continuously, over the course of many such changes.

Block 1010 comprises generating a prefix tree representation of the prefix table, such as prefix tree 270 and/or prefix tree 400. Specific characteristics of such a prefix tree, along with example techniques for generating such a prefix tree, are described in other sections. In an embodiment, virtual nodes are created within the prefix tree, as described elsewhere herein.

Block 1020 comprises dividing the prefix tree into subtrees, such as subtrees 510-550. Each subtree has exactly one root node, and is otherwise a set of connected nodes. The division process generally involves adding connected nodes to a subtree for as long as the stored size of the prefix entries corresponding to those nodes does not exceed the size of a data unit that is assigned to store the subtree's prefix entries. This data unit may be, for instance, a row, block, or other addressable unit within a second memory such as described elsewhere herein. When the stored size of the prefix entries would exceed that which can be stored in the data unit, a new subtree is started. Other example details of this division process are described elsewhere herein.

Block 1030 comprises translating the subtrees into the data structures that constitute the working representation of the prefix tree. This is by performed in two sub-steps for each subtree. First, block 1032 comprises storing the prefix entries for each real node of the subtree in a data unit allocated for that subtree. Additionally, prefix entries may be stored for some or all of virtual nodes in the subtree, as also explained elsewhere. For instance, block 1032 may entail storing prefix entries in a prefix array 284 and/or in rows 382 or 682. The entire prefix may be stored, or only an incremental part of the prefix may be stored, relative to the prefix of the root node of the subtree.

Block 1034 comprises storing the prefix of the root node of the subtree in an index entry within a first memory. For instance, block 1034 may comprise creating an entry in index 282, 382, or 682. A reference or pointer to the location of the data unit of block 1032 is also stored in this index entry. In an embodiment, the prefix may be truncated to its length. In an embodiment, the index entry is sorted within the index by its length.

Blocks 1032 are repeated for each subtree created in block 1020.

Flow 1000 illustrates only one of many possible flows for generating a working representation of a prefix table. Other flows may include fewer, additional, or different elements, in varying arrangements. In an embodiment, from one perspective, blocks 1010-1030 are performed at least partially concurrently. That is, the prefix tree is generated over time through addition, deletion, and other manipulation operations. These manipulation operations may require expanding, creating, or deleting subtrees, and then updating the working representation to reflect any changes.

3.3. Adding New Prefix Entries

Figure 11:
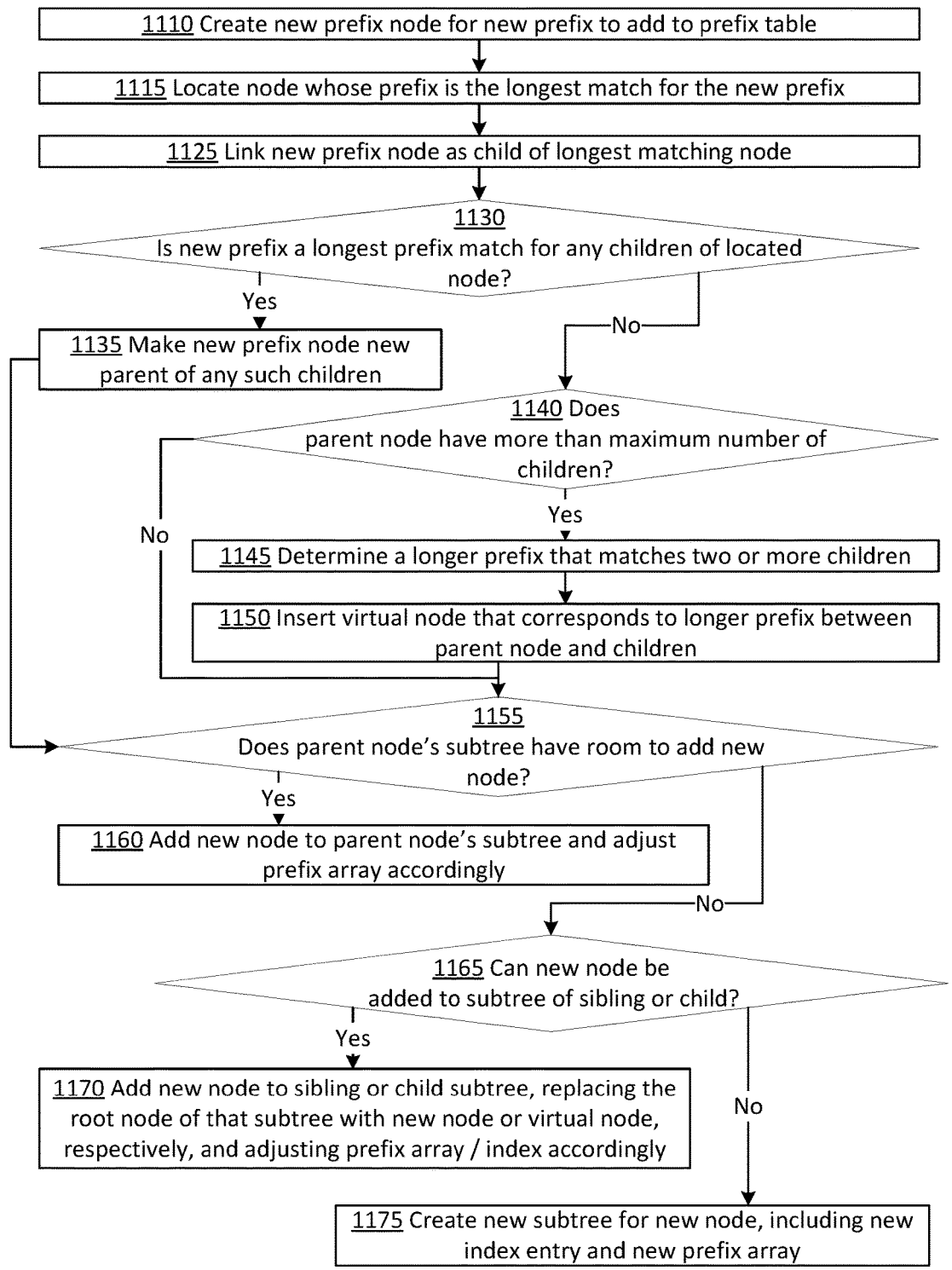
FIG. 11 illustrates an example flow for adding a new prefix to a prefix table.

FIG. 11 illustrates an example flow 1100 for adding a new prefix to a prefix table, according to an embodiment.

Block 1110 comprises creating a new prefix node for a new prefix that is being added to a prefix table. Block 1115 comprises locating the existing node within the prefix table whose prefix is the longest match for the new prefix. This node serves as an initial insertion point for the new node. Block 1125 comprises linking the new node to this longest matching node as a child of the longest matching node. In other words, the longest matching node is, at least initially, the parent of the new node.

Block 1130 comprises determining whether the new prefix is a longest prefix match for any child nodes of the longest matching node located in block 1115. If so, then the new node should be an intermediate node between these children and the longest matching node. Hence, in block 1135, the new node replaces the longest matching node as the parent node for these children. From block 1135, flow then proceeds to block 1155.

Otherwise, in block 1140, it is determined whether the longest matching node, with the addition of the new node as its child, now contains more than the maximum number of nodes. As previously explained, in an embodiment, a node may have no more than two children. In other embodiments, the maximum number of nodes may be numbers greater than two.

If the maximum number of child nodes has not been exceeded, flow proceeds to block 1155. Otherwise, if the maximum number of child nodes has been exceeded, then a virtual node is needed. Hence, flow proceeds to block 1145, in which a longer prefix match than the existing parent node is determined for two or more children of the parent node. The children chosen for this purpose may vary depending on the embodiment, and may or may not include the new node. Depending on the embodiment, the longer prefix match may be the longest prefix in common between the children node, or any other prefix that is shorter than this longest prefix but longer than the prefix of the parent node. Flow then proceeds to block 1150, which comprises inserting a virtual node that corresponds to the longer prefix match between the parent node and the two or more children.

For instance, if a new node for the prefix 011/3 is inserted as a child of a node corresponding to 0/1, but the node for 0/1 also has child nodes corresponding to 010/3 and 000/3, then the longer prefix match of 01/2 may be identified for the prefixes 011/3 and 010/3. A virtual node may be created for this longer prefix match, and this node may replace the node for 0/1 as the parent node for the nodes corresponding to the prefixes 011/3 and 010/3.

Flow then proceeds to block 1155. Block 1155 comprises determining whether the subtree for the parent node (i.e. the node located in block 1115) has room to add the new node. Block 1155 may comprise, for instance, determining whether a prefix array and/or a data unit in which the prefix array is stored has capacity to store the prefix entry for the new node. If there is room for the new node, then it is added to subtree for the parent node in block 1160. Otherwise, flow proceeds to block 1165.

Block 1165 comprises determining whether the new node can be added to the subtrees for any of its new sibling nodes and/or any of its child nodes, if different from that of the parent node. This may comprise determining whether there is room available in any of these subtrees. With respect to a sibling node, this may also comprise determining whether a virtual node has or can be inserted between the original parent node and the new/sibling nodes, so as to serve as the new index node for the sibling node's subtree.

If room is available, then in block 1170, the new node is added to the appropriate subtree. This may involve not only adding the new node to the prefix array for the subtree, but also replacing the index entry for the subtree in the prefix index with either the new prefix (in the case of the new node being added to a child node's subtree) or a virtual node (in the case of the new node being added to the sibling's subtree).

If room is not available in any child's subtree or sibling's subtree, then flow proceeds to block 1175, which comprises creating a new subtree for the new node. Creating this new subtree includes creating a new prefix array to store the new prefix entry and creating a new index entry in the prefix index that corresponds to the new prefix and points to the newly allocated location at which new prefix array is stored. In instances where the new node was inserted between existing nodes, block 1175 may further comprise transferring the children nodes of the new node to the new subtree by, for instance, moving their prefix entries to the new prefix array. Moving the prefix entries to a new prefix array may involve, for instance, copying the prefix entries to a new prefix array, and then deleting the old prefix array once the copying is complete.

Flow 1100 illustrates only one of many possible flows for adding a new prefix to a prefix table. Other flows may include fewer, additional, or different elements, in varying arrangements. For example, in some embodiments, blocks 1165 and 1170 may be omitted. Similar results might instead be achieved on a delayed basis by a background optimization process that identifies subtrees that can be merged or reorganized. As another example, in an embodiment, a flow may favor placing a new node in the same subtree as a child node or sibling node instead of with the parent node. In yet other embodiments, the order of creating virtual node(s) and creating the new node may be interchangeable. Furthermore, a flow may include steps for consolidating or removing virtual nodes that have become unnecessary in view of the newly added node, and/or replacing a virtual node with the newly added node.

In an embodiment, adding a node may involve splitting a subtree into two subtrees. As part of the addition operation, subtrees adjacent to the two subtrees may be analyzed to determine whether any of the adjacent subtrees may be merged with either of the two subtrees created during the splitting of the original subtree. For example, suppose subtree A is split into subtrees A1 and A2. After the splitting, it may be determined that subtree A2 is immediately connected to another subtree B via its root node or one of its leaf nodes. If A2 and B are, in combination, small enough to store in a single row, they may be merged together.

Adding a new prefix entry is one of several different operations that may be performed with respect to the prefix table. Other types of operations may include deleting entries, moving entries, expanding entries to include more forwarding instructions or other data, contracting entries, and so forth. Like with prefix addition, these types of operations may be performed in many different ways. These operations may further include various optimizations to consolidate subtrees. In an embodiment, these operations may include a number of local optimizations that create, split, and/or merge subtrees that are immediately connected to the affected subtree. For example, a deletion operation may include dividing a subtree in half at the deletion point, thus temporarily creating a new subtree. One or both of the subtrees may then be merged into adjacent subtrees, if the subtrees involved are small enough.

Further steps and decisions involved in other types of operations are similar to or easily derived from the foregoing, and thus extensive discussion of these operations is omitted for conciseness of the disclosure.

4.0. Tree-Based Longest Prefix Match Optimization

According to an embodiment, a sharded prefix tree, such as prefix tree 270 or 400, may be utilized for locating a longest prefix match in a prefix table without creating the working representation described elsewhere herein. For instance, forwarding logic 220 may access prefix trees 270 directly, and the working representation of forwarding table 280 may be omitted. In such an embodiment, an index is created either by directly linking index nodes within the prefix tree, or creating an entirely separate prefix index tree. Generally speaking, the principle of operation is to traverse the prefix tree in the manner one would conventionally traverse a prefix tree when searching for a longest prefix match, but to utilize the index nodes as shortcuts that bypass entire subtrees of the prefix tree, potentially avoiding traversal of significant numbers of non-index nodes in the path from the root node to the longest prefix match.

Figure 7:
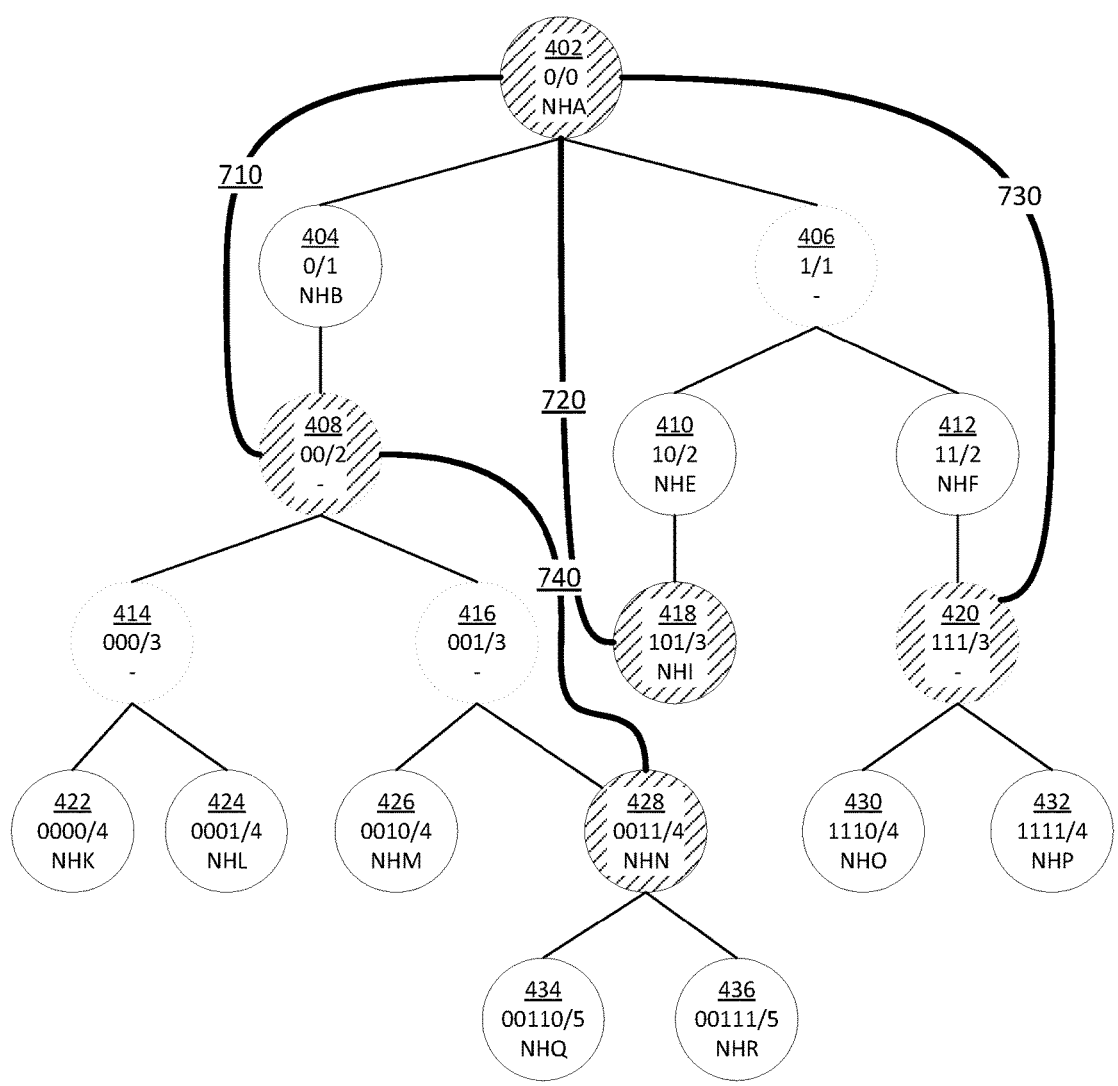
FIG. 7 depicts an example prefix tree in which index nodes have been linked directly.

FIG. 7 depicts a prefix tree 700 in which index nodes have been linked directly, according to an embodiment. Prefix tree 700 is created by linking the index nodes identified in arrangement 500 of prefix tree 400 using index edges 710-740. To locate a longest prefix match, the root node is first visited. Index nodes linked to the root node are located using index edges 710-740. If one of these index nodes matches the input key, the tree 700 is traversed via the appropriate index edge to the matching index node. Though not possible with the current tree 700, in other trees, the logic continues to traverse down the tree 700 via index edges any time one of the edges leads to another matching index node. In this manner, the logic arrives at the index node within the prefix tree whose prefix is a longest prefix match amongst the index nodes.

Once the longest prefix matching index node is located, the logic then proceeds with normal examination of the subtree of that index node. Only the nodes under the subtree need be examined to find the longest prefix match, as the subtree division logic guarantees that the longest prefix match must be in the subtree. If one of the nodes linked to the index node via its normal (non-index) edges is a longer prefix match for the input key, the logic proceeds to this linked node. The logic continues traversing down the normal edges of the subtree, if possible, to find longer and longer prefix matches, until no further matches can be found. At this point, the node at which the logic rests is the longest prefix match within the prefix tree.

Figure 8:
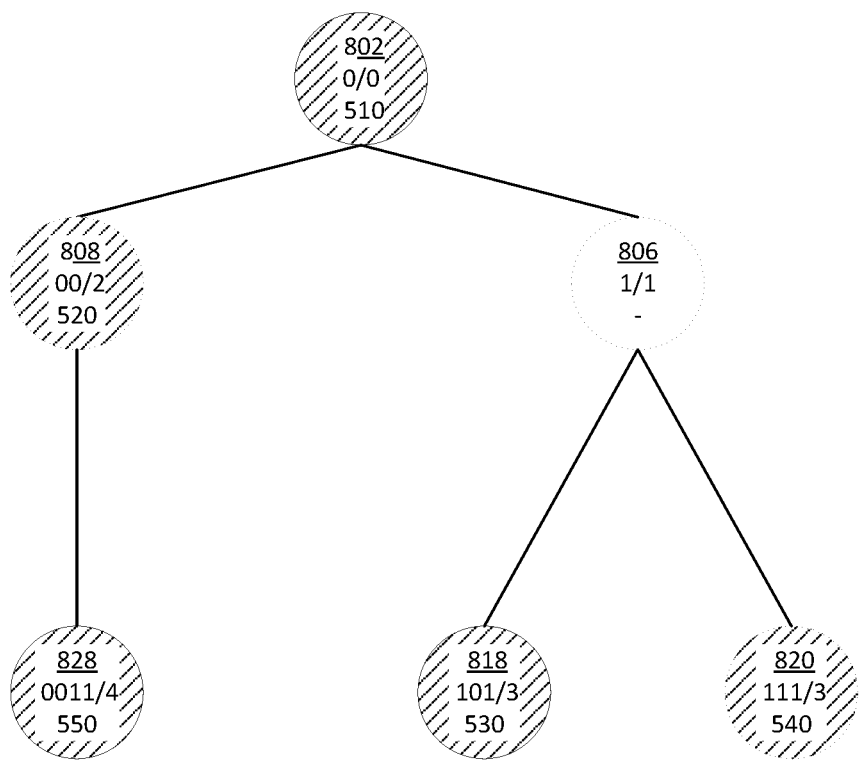
FIG. 8 depicts an example prefix index tree.

FIG. 8 depicts an alternative embodiment in which a separate prefix index tree 800 is created, according to an embodiment. Most nodes 802-820 of the prefix index tree 800 correspond to an index node in the arrangement 500 of prefix tree 400. However, instead of including forwarding instructions, each of these nodes includes a link to the corresponding subtree 510-550 for which the node is an index node. A prefix index tree may itself include virtual nodes, such as node 806, so as to ensure that each node has no more than a maximum number of child nodes.

To locate the longest prefix match for an input key in this alternative embodiment, matching nodes in the prefix index tree 800 are traversed downwards starting from node 802 until no further matches can be found. The subtree link of the final node 802-820 to be traversed is then followed to locate the corresponding index node in the prefix tree 400. From there, the subtree is traversed as explained above.

In an embodiment, a prefix index tree 800 may be stored in a faster memory than the prefix tree 400. However, in an embodiment, these techniques may realize significant benefits without relying upon more than one type of memory. Note that the subtree division logic may be adjusted so that it is based on a target subtree size that is not necessarily a function of any memory constraint. The target subtree size will vary from embodiment to embodiment and from implementation to implementation.

5.0. Multi-Level Index

In an embodiment, a prefix index may be split into multiple levels of entries in a TCAM and/or other suitable memory. In each level, the index entries are divided into groups, with the highest level having a single group. Entries in all but the lowest level point to the location of a group in the next level of the index whose entries should be searched for a longest prefix match. At any level, only the pointed to group of prefixes need be searched. The lowest level entries within the prefix index then point to prefix arrays.

For instance, in a two-level version of a prefix index, entries in a first level of the index may point to locations in a same or different memory where collections of lower-level entries are found. The lower-level entries may in turn point to prefix arrays, as described elsewhere. In an embodiment, each level may be a different TCAM or section of a TCAM. In an embodiment, each collection of lower-level entries may be in a different TCAM or section of a TCAM. Of course, any number of levels (up to the maximum prefix length) may exist, each of whose entries point to a different collection of longer prefixes in the next level of the index.

In an embodiment, to form different index levels, index trees such as index tree 800 may be utilized. For instance, index tree 800 may be divided into subtrees in similar manner to tree 400. Each node in index tree 800 may still correspond to an entry in the lower level of the index, while each root node of the subtrees in index tree 800 may be an entry in the higher level of the index.

The entries for a given subtree of index tree 800 are stored together in a common location. For instance, each subtree may be stored in a separate TCAM, or a distinct addressable segment within a same TCAM. The entries in the higher level of the index—i.e. the root nodes—point to the common location at which the entries for their respective subtrees are stored.

A search against such an index requires two passes. The first pass locates a longest prefix match in the highest level of the index. The second pass locates the longest prefix match in the corresponding subtree in lower level of the index. The longest prefix match in the lower level then points to the corresponding prefix array. The longest prefix match in the lower level is thus obtained without searching the entire index, since other subtrees can be ignored.

Hence, suppose index tree 800 were divided into three subtrees, consisting of the groups: 802-808, 806-818-820, and 828. If prefix tree 400 were represented using a two-tiered index, a search for the longest prefix match for 11111 would proceed as follows. The first level of the prefix index is initially processed, in which a longest prefix match is selected from the group of root index nodes 802, 806, and 828. This match would be 806, corresponding to the prefix 1/1. The second level of the prefix index is then processed, by searching for a longest prefix match from the group of nodes 806-818-820. This match would be 820, corresponding to the prefix 111/3. Finally, a longest prefix match is selected from the prefix array for subtree 540. This match is node 432, corresponding to the prefix 1111/4.

The number of subtrees may be fixed—e.g. there may be a target number of entries in the level of the index that corresponds to index tree 800. Or, the sizes of the subtrees (e.g. maximum and/or minimum) may be selected based on the amount of entries that may be stored in each addressable location for the next level of the index, in similar manner to prefix arrays. Hence, if the TCAM is divided into segments having a maximum of ten entries each, and each segment is a different subtree of index tree 800, then the maximum subtree size is ten.

In the case of indexes with more than two levels, an index tree 800 may be created for each level. For example, the same logic used in generating index tree 800 from tree 400 may be applied to index tree 800 to create a higher-level index tree, and this process may be repeated recursively to form yet further levels.

In an embodiment, as with prefix arrays, a prefix stored at a lower level may be stored using an incremental representation relative to the prefix at the root of the corresponding subtree. Thus, if the group of nodes 806-818-820 forms a subtree, then the prefix 111/3 at node 820 may simply be represented as 11/3, with the initial 1 inferred from the prefix 1/1 from node 806.

In an embodiment, in the case of index subtrees comprising only a single node, the root index node may point directly to a prefix array rather than to another level of the index. Further, in some embodiments, and even in embodiments with only a single level index, if the prefix array comprises only one entry, then the index entry for the root node of the prefix array may instead store forwarding instructions directly.

In an embodiment, each level may be stored in a same or different type of memory. For instance, all index levels may be stored in a TCAM. Or, a highest level of the prefix index may be stored in a highest-performing memory, an intermediate level may be stored in a lesser-performing memory, and the prefix arrays may be stored in a lowest performing memory. In another embodiment, some or all of the index levels may be stored in a RAM.

In an embodiment, each groups' entries are sorted by length within their respective locations, so as to ensure that the first match found in that location is the longest prefix match in the group.

Note that rather than being characterized as a multi-tiered prefix index and associated prefix arrays, in an embodiment, the organization of such a prefix tree may more generally be characterized as a hierarchy of prefix groups. Each entry in a group is associated with separate instructions, and the instructions either point to another prefix group to consider, or contain final forwarding instructions. A longest prefix match is sought from an initial group. If the instructions point to another group, a longest prefix match in that group is then sought, and this process may recur until final forwarding instructions are obtained. Each group may be stored in a same or different memory.

6.0. Example Embodiments

Examples of Some Embodiments are Represented, without Limitation, in the Following Clauses:

According to an embodiment, a method comprises: generating a prefix tree representing a prefix table, each prefix entry in the prefix table having a corresponding node in the prefix tree; dividing the prefix tree into non-overlapping subtrees; for each subtree of the subtrees: storing, within a prefix array for the subtree, a set of all prefix entries in the prefix table that correspond to nodes in the subtree; adding, to a prefix index, an entry comprising: a location at which the prefix array is stored and a prefix corresponding to a root node of the subtree, each subtree having a single root node; and utilizing the prefix index to locate a particular prefix array to search for a longest prefix match in the prefix table for a particular input key.

In an embodiment, the method further comprises locating the longest prefix match for the particular input key without searching prefix arrays other than the particular prefix array.

In an embodiment, each parent node within the prefix tree corresponds to a longest prefix match within the prefix tree for each prefix of each of its child nodes.

In an embodiment, within each subtree, each parent node corresponds to a longest prefix match within the subtree for each prefix of each of its child nodes.

In an embodiment, the method further comprises performing an action indicated by a particular prefix entry corresponding to the longest prefix match.

In an embodiment, the particular input key is a destination network address, wherein the action includes forwarding one or more packets specifying the destination network address to a next hop address indicated by the particular prefix entry.

In an embodiment, utilizing the prefix index comprises searching for a longest prefix match for the particular input key in the prefix index and reading address information from a particular index entry that corresponds to the longest prefix match in the prefix index; and searching the particular prefix array comprises reading the particular prefix array from a particular location indicated by the address information, and examining each prefix entry in the particular prefix array until determining that a particular prefix entry corresponds to a longest prefix match in the particular prefix array, the longest prefix match in the particular prefix array guaranteed to be the longest prefix match in the prefix table.

In an embodiment, the method further comprises: storing the prefix index in a ternary content-addressable memory (TCAM); and storing each prefix array in a random access memory, separate from the TCAM.

In an embodiment, dividing the prefix tree into the subtrees comprises determining the nodes to include in each subtree based at least partially upon whether a particular addressable data unit allocated to store the prefix array for the subtree has enough space to store all of the prefix entries in the prefix table that correspond to the nodes.

In an embodiment, the particular addressable data unit for each subtree is subdivided into a fixed number of discrete blocks, each prefix entry being stored in a different set of one or more discrete blocks.

In an embodiment, dividing the prefix tree into the subtrees comprises favoring subtree assignment decisions that do not increase the size of the prefix index.

In an embodiment, dividing the prefix tree into the subtrees comprises creating a new subtree for a newly added node only when there is not enough room for the newly added node in an existing subtree for a parent node of the newly added node.

In an embodiment, dividing the prefix tree into the subtrees comprises creating a new subtree for a newly added node only when there is not enough room for the newly added node in any existing subtree for a parent node, sibling node, or child node of the newly added node.

In an embodiment, generating the prefix tree comprises inserting virtual nodes into the prefix tree that do not correspond to existing prefix entries in the prefix table.

In an embodiment, at least one of the virtual nodes is a root node of one of the subtrees and thus has a corresponding entry in the prefix index.

In an embodiment, prefix entries for the virtual nodes are not stored in prefix arrays, except for any virtual node that is a root node of one of the subtrees.

In an embodiment, the prefix index comprises multiple levels of prefix index entries, wherein higher level prefix index entries point to different groups of prefix index entries in an immediately lower level.

In an embodiment, the method further comprises generating higher level prefix index entries by: generating an index tree from the root nodes of the subtrees, dividing the index tree into index subtrees, and creating a higher level prefix index entry for each index subtree, the higher level prefix index entry corresponding to the root node of the index subtree, and pointing a location in an immediately lower level at which prefix index entries for each node in the index subtree are found.

According to an embodiment, a system comprises: one or more memories storing a prefix table represented as a prefix index coupled to a plurality of prefix arrays; forwarding logic configured to utilize the prefix index to locate a particular prefix array to search for a longest prefix match in the prefix table for a particular input key; prefix table management logic configured to: generate a prefix tree representing the prefix table, each prefix entry in the prefix table having a corresponding node in the prefix tree; divide the prefix tree into non-overlapping subtrees; for each subtree of the subtrees: store, within a prefix array for the subtree, a set of all prefix entries in the prefix table that correspond to nodes in the subtree; and add, to the prefix index, an entry comprising: a location at which the prefix array is stored and a prefix corresponding to a root node of the subtree, each subtree having a single root node.

In an embodiment, the forwarding logic is further configured to perform an action indicated by a particular prefix entry corresponding to the longest prefix match.

In an embodiment, the particular input key is a destination network address, wherein the action includes forwarding one or more packets specifying the destination network address to a next hop address indicated by the particular prefix entry.

In an embodiment, the forwarding logic is configured to utilize the prefix index by searching for a longest prefix match for the particular input key in the prefix index and reading address information from a particular index entry that corresponds to the longest prefix match; and the forwarding logic is configured to search the particular prefix array by reading the particular prefix array from a particular location indicated by the address information, and examining each prefix entry in the particular prefix array until determining that a particular prefix entry corresponds to a longest prefix match in the particular prefix array, the longest prefix match in the particular prefix array guaranteed to be the longest prefix match in the prefix table.

In an embodiment, the one or more memories comprise: a ternary content-addressable memory (TCAM) configured to store the prefix index; and a random access memory, separate from the TCAM, configured to store the prefix arrays.

In an embodiment, the prefix table management logic is configured to divide the prefix tree into the subtrees by determining the nodes to include in each subtree based at least partially upon whether a particular addressable data unit allocated to store the prefix array for the subtree has enough space to store all of the prefix entries in the prefix table that correspond to the nodes.

In an embodiment, the prefix table management logic is configured to generate the prefix tree at least partially by inserting virtual nodes into the prefix tree that do not correspond to existing prefix entries in the prefix table.

In an embodiment, at least one of the virtual nodes is a root node of one of the subtrees and thus has a corresponding entry in the prefix index.

In an embodiment, the prefix index comprises multiple levels of prefix index entries, wherein higher level prefix index entries point to different groups of prefix index entries in an immediately lower level.

According to an embodiment, a method comprises: generating a prefix tree representing a prefix table, each prefix entry in the prefix table having a corresponding node in the prefix tree; dividing the prefix tree into non-overlapping subtrees, each subtree having a single root node; forming an index tree comprising each root node of each subtree; and traversing the index tree to locate a particular subtree to traverse for searching for a longest prefix match in the prefix table for a particular input key.

In an embodiment, the index tree is either a separate tree structure, or a tree formed by direct links between the root nodes in the prefix tree.

In an embodiment, the method further comprises locating the longest prefix match for the particular input key without traversing subtrees other than the particular subtree.

In an embodiment, parent node within the prefix tree corresponds to a longest prefix match within the prefix tree for each prefix of each of its child nodes.

In an embodiment, within each subtree, each parent node corresponds to a longest prefix match within the subtree for each prefix of each of its child nodes.

In an embodiment, each parent node within the index tree corresponds to a longest prefix match within the index tree for each prefix of each of its child nodes.

In an embodiment, the method further comprises performing an action indicated by a particular prefix entry corresponding to the longest prefix match.

In an embodiment, the particular input key is a destination network address, wherein the action includes forwarding one or more packets specifying the destination network address to a next hop address indicated by the particular prefix entry.

In an embodiment, traversing the index tree comprises traversing down the index tree along index edges that lead to nodes that match the particular input key, until said traversal of the index tree is no longer possible, having thus arrived at a longest prefix match within the index tree; and searching the particular prefix array comprises, starting from the node at which the traversal of the index tree ended, traversing down the prefix tree edges along edges that lead to nodes that match the particular input key, until said traversal of the prefix tree is no longer possible, having thus arrived at a longest prefix match in the prefix tree.

In an embodiment, generating the prefix tree comprises inserting virtual nodes into the prefix tree that do not correspond to existing prefix entries in the prefix table.

In an embodiment, at least one of the virtual nodes is a root node of one of the subtrees and thus is also a node of the index tree.

In an embodiment, the method further comprises generating multiple levels of index trees.

Other examples of these and other embodiments are found throughout this disclosure.

7.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 12:
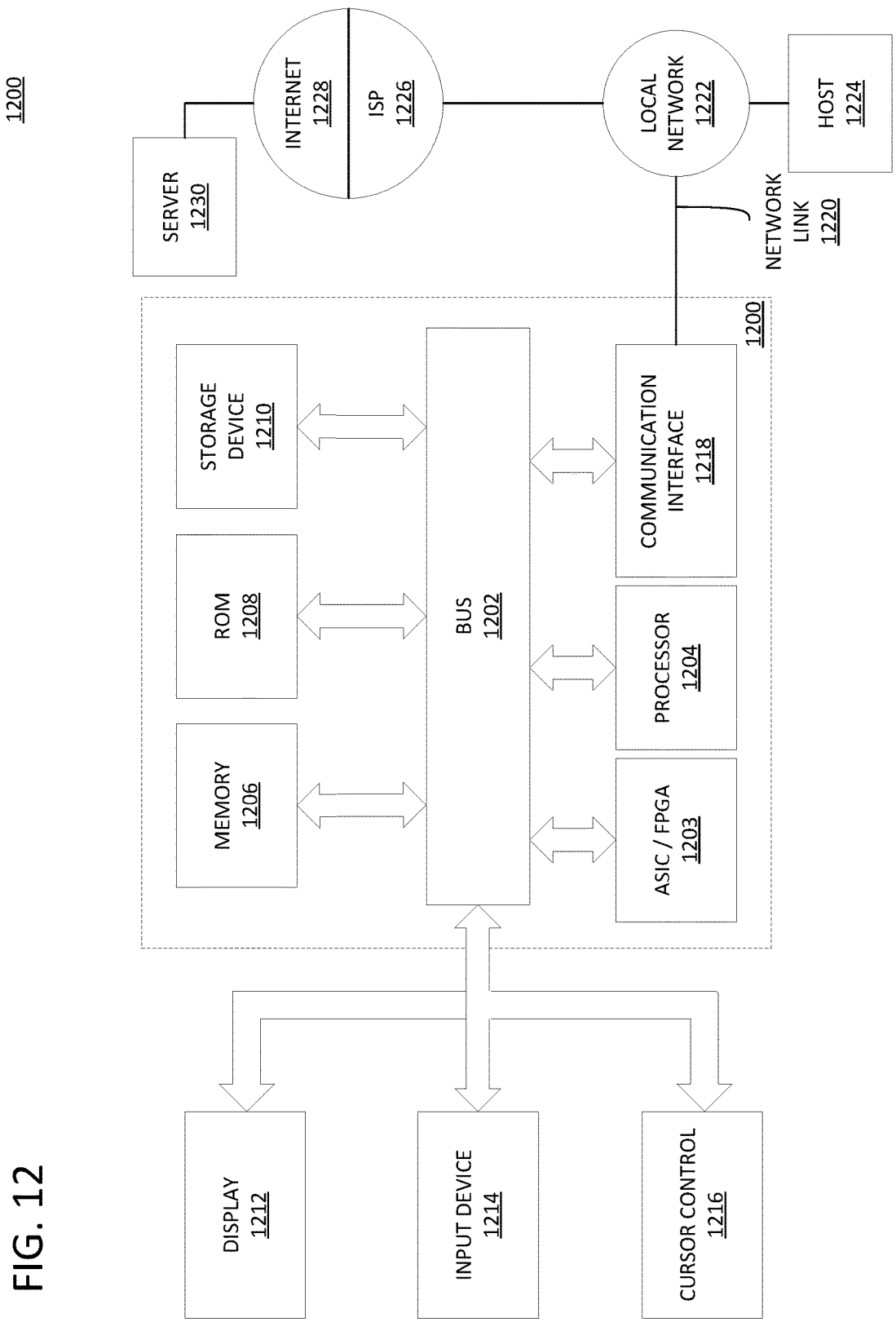
FIG. 12 is block diagram of a computer system upon which embodiments of the inventive subject matter may be implemented.

FIG. 12 is a block diagram that illustrates a computer system 1200 that may be utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device.

Computer system 1200 may include one or more ASICs, FPGAs, or other specialized circuitry 1203 for implementing program logic as described herein. For example, circuitry 1203 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1200 may include one or more hardware processors 1204 configured to execute software-based instructions. Computer system 1200 may also include one or more busses 1202 or other communication mechanism for communicating information. Busses 1202 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1200 also includes one or more memories 1206, such as a RAM, hardware registers, or other dynamic or volatile storage device for storing data units to be processed by the one or more ASICs, FPGAs, or other specialized circuitry 1203. Memory 1206 may also or instead be used for storing information and instructions to be executed by processor 1204. Memory 1206 may be directly connected or embedded within circuitry 1203 or a processor 1204. Or, memory 1206 may be coupled to and accessed via bus 1202. Memory 1206 also may be used for storing temporary variables, data units describing rules or policies, or other intermediate information during execution of program logic or instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, may optionally be provided and coupled to bus 1202 for storing information and instructions.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as a 1202.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 can send packets and receive data through the network(s), network link 1220, and communication interface 1218. In some embodiments, this data may be data units that the computer system 1200 has been asked to process and, if necessary, redirect to other computer systems via a suitable network link 1220. In other embodiments, this data may be instructions for implementing various processes related to the described techniques. For instance, in the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

Computer system 1200 may optionally be coupled via bus 1202 to one or more displays 1212 for presenting information to a computer user. For instance, computer system 1200 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are optionally coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

As discussed, computer system 1200 may implement techniques described herein using customized hard-wired logic, one or more ASICs or FPGAs 1203, firmware and/or program logic, which in combination with the computer system causes or programs computer system 1200 to be a special-purpose machine. According to one embodiment, however, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1200 can receive the data on the network and demodulate the signal to decode the transmitted instructions. Appropriate circuitry can then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

8.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device comprising:
   one or more memories storing a prefix table represented as a prefix index coupled to a plurality of prefix arrays;
   forwarding logic configured to search for a longest prefix match in the prefix table for a particular input key by:
   searching for a first longest prefix match for the particular input key in the prefix index;
   reading address information that corresponds to the first longest prefix match;
   reading a particular prefix array from a particular location indicated by the address information;
   examining each prefix entry in the particular prefix array until determining that a particular prefix entry corresponds to a second longest prefix match in the particular prefix array, the second longest prefix match being the longest prefix match for the particular input key in the prefix table;
   prefix table management logic configured to:
   generate a prefix tree representing the prefix table, each prefix entry in the prefix table having a corresponding node in the prefix tree;
   divide the prefix tree into non-overlapping subtrees;
   for each subtree of the subtrees:
   store, within a prefix array for the subtree, a set of all prefix entries in the prefix table that correspond to nodes in the subtree;
   add, to the prefix index, an entry comprising: a location at which the prefix array is stored and a prefix corresponding to a root node of the subtree, each subtree having a single root node.

2. The network device of claim 1, wherein the forwarding logic is further configured to perform an action indicated by the particular prefix entry corresponding to the longest prefix match.

3. The network device of claim 2, wherein the particular input key is a destination network address, wherein the action includes forwarding one or more packets specifying the destination network address to a next hop address indicated by the particular prefix entry.

4. The network device of claim 1, wherein the one or more memories comprise:
   a ternary content-addressable memory (TCAM) configured to store the prefix index;
   a random access memory, separate from the TCAM, configured to store the prefix arrays.

5. The network device of claim 1, wherein the prefix table management logic is configured to divide the prefix tree into the subtrees by determining the nodes to include in each subtree based at least partially upon whether a particular addressable data unit allocated to store the prefix array for the subtree has enough space to store all of the prefix entries in the prefix table that correspond to the nodes.

6. The network device of claim 1, wherein the prefix table management logic is configured to generate the prefix tree at least partially by inserting virtual nodes into the prefix tree that do not correspond to existing prefix entries in the prefix table.

7. The network device of claim 6, wherein at least one of the virtual nodes is a root node of one of the subtrees and thus has a corresponding entry in the prefix index.

8. The network device of claim 1, wherein the electronic circuitry is implemented in one or more of: an application-specific integrated circuit, a field programmable gate array, or a processor.

9. A method comprising:
   generating, by a network device having electronic circuitry, a prefix tree representing a prefix table, each prefix entry in the prefix table having a corresponding node in the prefix tree;
   dividing the prefix tree into non-overlapping subtrees;
   for each subtree of the subtrees:
   storing, within a prefix array for the subtree, a set of all prefix entries in the prefix table that correspond to nodes in the subtree;
   adding, to a prefix index, an entry comprising: a location at which the prefix array is stored and a prefix corresponding to a root node of the subtree, each subtree having a single root node;
   at the network device, searching for a longest prefix match in the prefix table for a particular input key by:

searching for a first longest prefix match for the particular input key in the prefix index;

reading address information that corresponds to the first longest prefix match;

reading a particular prefix array from a particular location indicated by the address information;

examining each prefix entry in the particular prefix array until determining that a particular prefix entry corresponds to a second longest prefix match in the particular prefix array, the second longest prefix match being the longest prefix match for the particular input key in the prefix table.

10. The method of claim 9, further comprising performing an action indicated by the particular prefix entry corresponding to the longest prefix match.

11. The method of claim 10, wherein the particular input key is a destination network address, wherein the action includes forwarding one or more packets specifying the destination network address to a next hop address indicated by the particular prefix entry.

12. The method of claim 9, further comprising:
storing the prefix index in a ternary content-addressable memory (TCAM);
storing each prefix array in a random access memory, separate from the TCAM.

13. The method of claim 9, wherein dividing the prefix tree into the subtrees comprises determining the nodes to include in each subtree based at least partially upon whether a particular addressable data unit allocated to store the prefix array for the subtree has enough space to store all of the prefix entries in the prefix table that correspond to the nodes.

14. The method of claim 9, wherein generating the prefix tree comprises inserting virtual nodes into the prefix tree that do not correspond to existing prefix entries in the prefix table.

15. The method of claim 14, wherein at least one of the virtual nodes is a root node of one of the subtrees and thus has a corresponding entry in the prefix index.

16. One or more non-transitory computer-readable media storing instructions that, when executed by one or more computing devices, cause:
generating a prefix tree representing a prefix table, each prefix entry in the prefix table having a corresponding node in the prefix tree;
dividing the prefix tree into non-overlapping subtrees;
for each subtree of the subtrees:
storing, within a prefix array for the subtree, a set of all prefix entries in the prefix table that correspond to nodes in the subtree;
adding, to a prefix index, an entry comprising: a location at which the prefix array is stored and a prefix corresponding to a root node of the subtree, each subtree having a single root node;
searching for a longest prefix match in the prefix table for a particular input key by:
searching for a first longest prefix match for the particular input key in the prefix index;
reading address information that corresponds to the first longest prefix match;
reading a particular prefix array from a particular location indicated by the address information;
examining each prefix entry in the particular prefix array until determining that a particular prefix entry corresponds to a second longest prefix match in the particular prefix array, the second longest prefix match being the longest prefix match for the particular input key in the prefix table.

17. The one or more non-transitory computer-readable media of claim 16, wherein the instructions, when executed by one or more computing devices, further cause performing an action indicated by a particular prefix entry corresponding to the longest prefix match.

18. The one or more non-transitory computer-readable media of claim 17, wherein the particular input key is a destination network address, wherein the action includes forwarding one or more packets specifying the destination network address to a next hop address indicated by the particular prefix entry.

19. The one or more non-transitory computer-readable media of claim 16, wherein the instructions, when executed by one or more computing devices, further cause:
storing the prefix index in a ternary content-addressable memory (TCAM);
storing each prefix array in a random access memory, separate from the TCAM.

20. The one or more non-transitory computer-readable media of claim 16, wherein dividing the prefix tree into the subtrees comprises determining the nodes to include in each subtree based at least partially upon whether a particular addressable data unit allocated to store the prefix array for the subtree has enough space to store all of the prefix entries in the prefix table that correspond to the nodes.

* * * * *